United States Patent
Minami et al.

(10) Patent No.: US 6,562,886 B1
(45) Date of Patent: May 13, 2003

(54) PROPYLENE POLYMER COMPOSITION AND FILMS MADE THEREFROM

(75) Inventors: Yutaka Minami, Ichihara (JP); Yasuhiro Mogi, Ichihara (JP); Takuji Okamoto, Ichihara (JP); Tsuyoshi Ota, Ichihara (JP); Hideo Funabashi, Ichihara (JP); Yasushi Seta, Ichihara (JP)

(73) Assignee: Idemistsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/463,989

(22) PCT Filed: Aug. 17, 1998

(86) PCT No.: PCT/JP98/03645

§ 371 (c)(1),
(2), (4) Date: Apr. 27, 2000

(87) PCT Pub. No.: WO99/09098

PCT Pub. Date: Feb. 25, 1999

(30) Foreign Application Priority Data

| | | |
|---|---|---|
| Aug. 19, 1997 | (JP) | 9-222634 |
| Aug. 27, 1997 | (JP) | 9-230611 |
| Feb. 23, 1998 | (JP) | 10-39960 |
| Mar. 6, 1998 | (JP) | 10-54957 |
| Mar. 6, 1998 | (JP) | 10-54958 |
| Apr. 8, 1998 | (JP) | 10-95931 |

(51) Int. Cl.$^7$ ............................ C08K 5/521; C08F 10/06
(52) U.S. Cl. ................ 524/115; 524/366; 525/240; 526/351
(58) Field of Search ..................... 526/352, 351; 525/240; 524/115, 366

(56) References Cited

U.S. PATENT DOCUMENTS 6,303,696 B1 * 10/2001 Ushioda et al. ............. 525/240

FOREIGN PATENT DOCUMENTS

| | | |
|---|---|---|
| JP | 62-119212 | 5/1987 |
| JP | 05-112682 | 5/1993 |
| JP | 08-208909 | 8/1996 |
| JP | 09-296084 | 11/1997 |
| JP | 10-158330 | 6/1998 |

* cited by examiner

Primary Examiner—David W. Wu
Assistant Examiner—R. Harlan
(74) Attorney, Agent, or Firm—Oblon, Spivak, McClelland, Maier & Neustadt, P.C.

(57) ABSTRACT

A propylene homopolymer or a copolymer of propylene and an α-olefin with at least 4 carbon atoms, which is produced through polymerization in the presence of a metallocene catalyst and which has an increased isotactic pentad fraction and a reduced molecular weight distribution; and also a propylene-based polymer composition as prepared by adding a nucleating agent to the homopolymer or the copolymer are superior to conventional polymers and polymer compositions, as they have well-balanced toughness and heat-sealability, and are not sticky, and, in addition, they have excellent anti-blocking properties. Their films especially those for wrapping and packaging edibles are tough and have excellent anti-blocking properties, and high film impact resistance. The polymer and the polymer composition have good moldability.

48 Claims, 1 Drawing Sheet

PROPYLENE POLYMER COMPOSITION AND FILMS MADE THEREFROM

TECHNICAL FIELD

The present invention relates to propylene-based resins and propylene-based polymer compositions, and also to films and laminates made of them.

More precisely, the invention relates to propylene-based polymers and propylene-based polymer compositions, and also to films, for example, those for wrapping or packaging edibles, as well as laminates, fibers, sheets and moldings made of them, and they have the advantages of good low-temperature heat-sealability, well-balanced toughness and heat-sealability which no one has heretofore experienced in the art, as well as improved anti-blocking properties, improved slip characteristics and improved moldability.

BACKGROUND ART

Polypropylene has good physical properties, as being tough and resistant to heat, and is inexpensive. Therefore, it is a general-purpose resin having many applications in various fields.

For example, as having the advantages of high transparency, high toughness, good heat resistance and little water absorption, polypropylene is used for cast films such as biaxially-oriented films, laminate films, etc. In particular, films of a crystalline propylene-based polymer are widely used as wrapping or packaging films, as having the advantages of high toughness, high transparency and good moisture-proofness.

In general, the films are formed into bags through heat-sealing. After having been filled with objects, the bags are closed by again heat-sealing their open ends.

The recent tendency in the art is toward high-speed production lines for fabricating bags and packages so as to improve the productivity. To meet the requirement, it is desired to improve the quality of films. For example, a plurality of resins having different properties are layered, and the resulting multi-layered films are being widely used. Of such multi-layered films, the resin film to be the outermost layer is specifically desired to have good physical properties of low-temperature heat-sealability (this is for facilitating high-speed production lines for fabricating bags and packages), slip characteristics (these are for attaining smooth re-winding of films), and anti-blocking properties.

In other fields of sheets and non-woven fabrics except the films as above, it is also desired to lower the temperature for layer lamination.

As compared with ethylene-based polymers, propylene-based polymers may have a larger degree of supercooling necessary for the start of their crystallization, and therefore have a lower crystallization temperature (Tc) when their melting point (Tm) is on the same level as that of ethylene-based polymers. This is more noticeable for propylene-based copolymers and polymers with lower stereospecificity, a shaving lower crystallinity. As a result, propylene-based polymers are often difficult to mold, and, in addition, their resin characteristics are poor. In particular, their transparency is low, the heat-sealing temperature (HST) for them is high, and their elasticity and impact resistance are poor. Especially for film applications, propylene-based polymers are often confronted with many problems. For example, with propylene-based polymers being required to have low-temperature heat-sealability comparable to that of linear low-density polyethylene, the problems are that the polymers often fail to be formed into good films, in particular, the films formed often fail to be smoothly released from chill rolls, the edges of the films are unstable, and the films are readily scratched by sweeper rolls. Therefore, to obtain films, fibers, sheets and moldings of the polymers having good low-temperature heat-sealability, the problems with the polymers as above must be solved.

Heretofore, a method of copolymerizing propylene homopolymers with a small amount a comonomer of ethylene, 1-butene or the like has been proposed for improving the low-temperature heat-sealability of films of the polymers. In the method, however, a large amount of ethylene or 1-butene must be copolymerized with the polymers in order to secure satisfactory low-temperature heat-sealability of the polymers. If so, the polymers shall contain a large amount of sticky side products, and, as a result, their anti-blocking properties are greatly worsened, and, in addition, the side products bleed out of the films of the polymers whereby the films are seen whitish and their appearances are not good. After all, the films of the polymers are not on the practicable level. What is more, the crystallinity of the polymers is low, and the films of the polymers could not be tough. Further, the moldability of the polymers is poor, and the anti-blocking properties of the films of the polymers are poor.

To solve the problem, tried is a method of removing the sticky component from the polymers by dissolving it in an inert solvent. In this method, however, even the low-temperature-melting crystalline component that contributes to the low-temperature heat-sealability of the polymers is inevitably removed from the polymers. At present, after all, the low-temperature heat-sealability of the polymers could not be still improved to a satisfactory degree even in the method.

On the other hand, tried is another method of copolymerizing propylene homopolymers with some $\alpha$-olefin other than ethylene or 1-butene, for example, with 1-hexene, 1-octene, 4-methyl-1-pentene or the like. According to the prior art technology, however, resins obtained all have an extremely broad compositional distribution, and it is difficult to improve their anti-blocking properties, toughness and moldability up to the practicable level.

Conventional propylene-based polymers obtained in the presence of a known Ziegler catalyst have a broad molecular weight distribution and a broad compositional distribution, and are not homogeneous. Therefore, the high-crystalline component in the polymers could readily form crystalline nuclei, and, as a result, the degree of supercooling necessary for the start of their crystallization is not so large and the moldability of the polymers is not so much lowered. However, as their composition is not homogeneous, the polymers have poor physical properties. In particular, as containing a sticky component and a high-crystalline component, the polymers could not exhibit good physical properties intrinsic to resins.

Recently, single-site metallocene catalysts have been developed. Polypropylene obtained in the presence of such a metallocene catalyst has a homogeneous composition and contains a reduced amount of a sticky component and a high-crystalline component that may worsen the physical properties of the polymer. Therefore, the physical properties of the polymer are better than those of the other polymers produced in the presence of any other conventional catalyst.

However, as the polymer has a homogeneous composition, the degree of supercooling for it is enlarged and the moldability of the polymer is lowered.

A method of using the propylene-based polymer obtained in the presence of a metallocene catalyst, as a heat-sealability improver for the propylene-based polymer obtained in the presence of a conventional Ziegler catalyst has been proposed (Japanese Patent Laid-Open Nos. 173016/1990, 112682/1993, 112683/1993). The method is effective in some degree for improving the balance of the heat-sealability and the toughness of the polymer films, but could not still solve the problem with the polymer composition in point of the balance between the moldability of the polymer composition and the physical properties of the polymer films.

In that situation, the present invention is to further improve the heat-sealability of polypropylene films, without interfering with the intrinsic good properties of the films, to such a degree that the improved heat-sealability of the films is comparable to that of linear low-density polyethylene films. Specifically, the object of the invention is to provide propylene-based polymers and propylene-based polymer compositions, and also their films including those for wrapping and packaging edibles, as well as their fibers, sheets, non-woven fabrics and other various moldings all having highly improved and well-balanced physical properties including heat-sealability, anti-blocking properties, toughness and impact resistance.

Another object of the invention is to provide propylene-based resins favorable to sealants, and also to provide films of the resin, as well as laminates comprising at least one layer of the resin.

DISCLOSURE OF THE INVENTION

We, the present inventors have assiduously studied so as to attain the objects noted above, and, as a result, have found that, when a substance capable of readily inducing crystalline nuclei in a melt of a propylene-based polymer to thereby reduce the degree of supercooling necessary for the polymer crystallization but not detracting from the physical properties of the polymer at all, for example, a nucleating agent, a high-molecular nucleating agent, a propylene-based polymer having a low degree of crystallinity, a propylene-based polymer having a low molecular weight or the like is added to a propylene-based polymer obtained in the presence of a metallocene catalyst and having a homogeneous composition, then the resulting propylene-based polymer composition could have well-balanced physical properties and moldability. On the basis of this finding, we have completed the present invention.

Specifically, the invention is summarized as follows:

The first aspect of the invention includes the following:

(1) A propylene-based polymer composition comprising (1-A) a propylene homopolymer obtained through polymerization in the presence of a metallocene catalyst and having an isotactic pentad fraction (mmmm fraction) of from 80 to 99 mol %, a molecular weight distribution (Mw/Mn) of at most 3.5, and an intrinsic viscosity [η] of from 0.5 to 5.0 dl/g, and (1-B) at least 10 ppm of a nucleating agent.

(2) A propylene-based polymer composition comprising (1-A) a propylene-based random copolymer obtained through polymerization of propylene, and ethylene and/or an α-olefin having from 4 to 20 carbon atoms in the presence of a metallocene catalyst, and having a propylene-derived structural unit content of from 80 to 100 mol %, an ethylene and/or C4–20 α-olefin-derived structural unit content of from 0 to 20 mol %, a molecular weight distribution (Mw/Mn) of at most 3.5, and an intrinsic viscosity [η] of from 0.5 to 5.0 dl/g, and (1-B) at least 10 ppm of a nucleating agent, for example, metal salts of organic phosphoric acids, talc, dibenzylidene-sorbitol and its derivatives, or amide compounds, and the like.

(3) A propylene-based polymer composition of which the tensile modulus (TM (MPa)) in the MD direction and the heat-sealing temperature (HST (° C.)) satisfy the following formula (1-II):

$$TM \geq 22 \times HST - 1850 \tag{1-II}$$

(4) Films as formed by casting the propylene-based polymer composition of any of above (1) to (3).

(5) Films for wrapping or packaging edibles, which are formed by casting the propylene-based polymer composition containing, as the nucleating agent, any of metal salts of organic phosphoric acids or talc.

The second aspect of the invention includes the following:

(6) A polypropylene-based resin composition comprising (2-A) from 50 to 99 parts by weight of a propylene homopolymer obtained through polymerization in the presence of a metallocene catalyst and having an isotactic pentad fraction (mmmm fraction) of from 80 to 99 mol %, an intrinsic viscosity [η] of from 1.0 to 2.0 dl/g, and a molecular weight distribution (Mw/Mn) of at most 3.5, and (2-B) from 1 to 50 parts by weight of a propylene homopolymer obtained through polymerization in the presence of a metallocene catalyst and having an intrinsic viscosity [η] of from 0.01 to 1.0 dl/g, and a molecular weight distribution (Mw/Mn) of at most 3.5; and films made of the polypropylene-based resin composition.

The third aspect of the invention includes the following:

(7) A propylene-based resin comprising (3-A) from 55 to 99 parts by weight of a copolymer of propylene and an α-olefin having at least 5 carbon atoms, and (3-B) from 1 to 45 parts by weight of a propylene-based polymer of which the crystallization temperature as measured through differential scanning calorimetry is higher than that of (3-A).

(8) The propylene-based resin of (7), wherein the crystallization temperature (Tca (° C.)) of the copolymer (3-A) and the crystallization temperature (Tcb (° C.)) of the propylene-based polymer (3-B), both measured through differential scanning calorimetry, satisfy the following formula:

$$Tcb - Tca \geq 20 \tag{3-I}$$

(9) The propylene-based resin of (7) or (8), which satisfies the following requirements (i), (ii) and (iii) in its temperature-programmed fractionation chromatography (TREF):

(i) The amount of its fraction eluted within the temperature range between (Tp–5)° C. and (Tp+5)° C. is at least 65% by weight, with Tp being the peak temperature for essential elution;

(ii) The amount of its fraction eluted within the temperature range not higher than 0° C. is at most 3% by weight; and (iii) The amount of its fraction eluted within the temperature range not lower than Tp+10° C. is from 1 to 45% by weight of all eluates.

(10) The propylene-based resin of any of (7) to (9), of which the peak top temperature on the highest temperature side in its crystallization curve measured through differential scanning calorimetry is not lower than 85° C.

(11) The propylene-based resin of any of (7) to (19), of which the peak top temperature on the lowest temperature side in its melting curve measured through differential scanning calorimetry is not higher than 150° C.

(12) The propylene-based resin of any of (7) to (11), wherein the copolymer (A) satisfies the following (A-i) and (A-ii) in its temperature-programmed fractionation chromatography:

(A-i) The amount of its fraction eluted within the temperature range between (Tp−5)° C. and (Tp+5)° C. is at least 70% by weight, with Tp being the peak temperature for essential elution; and (A-ii) The amount of its fraction eluted within the temperature range not higher than 0° C. is at most 3% by weight.

(13) The propylene-based resin of any of (7) to (12), wherein the copolymer (3-A) satisfies at least any one of the following (A-iii), (A-iv) and (A-v):

(A-iii) The content of α-olefin units having at least 5 carbon atoms (α mol %) in the copolymer (3-A) is from 0.1 mol % to 12 mol %;

(A-iv) The stereospecificity index (P) of the copolymer (3-A) is at least 85 mol %; and (A-v) The intrinsic viscosity ([η]) of the copolymer (3-A), as measured in decalin at 135° C., is from 0.5 to 3.0 g/dl.

(14) The propylene-based resin of any of (7) to (12), wherein the constituent α-olefin units having at least 5 carbon atoms in the copolymer (3-A) are from at least one of 1-octene, 1-dodecene and 1-decene.

(15) Films made of the propylene-based resin of any of (7) to (14); or laminates comprising at least one layer of the propylene-based resin.

The fourth aspect of the invention includes the following:

(16) A propylene-based random copolymer of propylene and an α-olefin having at least 5 carbon atoms, which satisfies the following formula (4-I):

$$Tm \leq 140, \text{ and } Tm \leq 160 - 7\alpha \quad (4\text{-I})$$

wherein Tm (° C.) indicates the melting point of the copolymer measured through differential scanning calorimetry, and α (mol %) indicates the content of α-olefin units having at least 5 carbon atoms in the copolymer;

and satisfies the following formula (4-II):

$$Tc \geq 0.75Tm - 15 \quad (4\text{-II})$$

wherein Tc (° C.) and Tm (° C.) each indicate the crystallization temperature and the melting point, copolymer both measured through differential scanning calorimetry.

(17) A propylene-based random copolymer composition comprising (4-A) a propylene-based random copolymer of propylene and an α-olefin having at least 5 carbon atoms, and (4-B) a substance having the capability of nucleation, the composition satisfying the following formula (4-I):

$$Tm \leq 140, \text{ and } Tm \leq 160 - 7\alpha \quad (4\text{-I})$$

wherein Tm (° C.) indicates the melting point of the composition measured through differential scanning calorimetry, and α (mol %) indicates the content of α-olefin units having at least 5 carbon atoms in the composition;

and satisfying the following formula (4-II):

$$Tc \geq 0.75Tm - 15 \quad (4\text{-II})$$

wherein Tc (° C.) and Tm (° C.) each indicate the crystallization temperature and the melting point, respectively, of the composition both measured through differential scanning calorimetry.

(18) The propylene-based random copolymer of above (16), or the propylene-based random copolymer composition of (17), wherein the content of α-olefin units having at least 5 carbon atoms is from 0.1 to 12 mol %.

(19) The propylene-based random copolymer of above (16) or (18), which has a stereospecificity index (P) of at least 85 mol %; or the propylene-based random copolymer composition of (17) or (18), wherein the copolymer has a stereospecificity index (P) of at least 85 mol %.

(20) The propylene-based random copolymer of above (16), (18) or (19), or the propylene-based random copolymer composition of any of (17) to (19), which has an intrinsic viscosity [η], as measured in decalin at 135° C., of from 0.5 to 3 dl/g.

(21) The propylene-based random copolymer of above (16), or any of (18) to (20), or the propylene-based random copolymer composition of any of (17) to (20), wherein the α-olefin units having at least 5 carbon atoms are from at least one of 1-octene, 1-decene and 1-dodecene.

(22) Films made of the copolymer or the copolymer composition of any of above (16) to (21); laminates comprising at least one layer of the copolymer or the copolymer composition; as well as fibers, sheets or moldings comprising the copolymer or the copolymer composition.

The fifth aspect of the invention includes the following:

(23) A propylene-based random copolymer of propylene and 1-butene, which satisfies the following formula (5-I):

$$Tm \leq 160 - 3\alpha \quad (5\text{-I})$$

wherein Tm (° C.) indicates the melting point of the copolymer measured through differential scanning calorimetry, and α (mol %) indicates the 1-butene unit content of the copolymer;

and satisfies the following formula (5-II):

$$Tc \geq 0.75Tm - 10 \quad (5\text{-II})$$

wherein Tc (° C.) and Tm (° C.) each indicate the crystallization temperature and the melting point, respectively, of the copolymer both measured through differential scanning calorimetry.

(24) A propylene-based random copolymer composition comprising (5-A) a propylene-based random copolymer of propylene and 1-butene, and (5-B) a substance having the capability of nucleation, the composition satisfying the following formula (5-I):

$$Tm \leq 160 - 3\alpha \quad (5\text{-I})$$

wherein Tm (° C.) indicates the melting point of the composition measured through differential scanning calorimetry, and α (mol %) indicates the 1-butene content of the composition;

and satisfying the following formula (5-II):

$$Tc \geq 0.75Tm - 10 \quad (5\text{-II})$$

wherein Tc (° C.) and Tm (° C.) each indicate the crystallization temperature and the melting point, respectively, of the composition both measured through differential scanning calorimetry.

(25) The propylene-based random copolymer of above (23), or the propylene-based random copolymer composition of (24), which has a 1-butene content of from 0.1 to 30 mol %.

(26) The propylene-based random copolymer of above (23) or (25), which has a stereospecificity index (P) of at least 85 mol %; or the propylene-based random copolymer composition of (24) or (25), wherein the copolymer has a stereospecificity index (P) of at least 85 mol %.

(27) The propylene-based random copolymer of above (23), (25) or (26), or the propylene-based random copolymer composition of any of (24) to (26), which has an intrinsic viscosity [η], as measured in decalin at 135° C., of from 0.5 to 3 dl/g.

(28) Films made of the copolymer or the copolymer composition of any of above (23) to (27); laminates comprising at least one layer of the copolymer or the copolymer composition; and fibers, sheets or moldings comprising the copolymer or the copolymer composition.

The sixth aspect of the invention includes the following:

(29) A propylene-based polymer composition comprising (A) a propylene-based random copolymer obtained through polymerization of propylene and an α-olefin having at least 4 carbon atoms in the presence of a metallocene catalyst, and having a propylene-derived structural unit content of from 80 to 99.9 mol %, an α-olefin-derived structural unit content of from 0.1 to 20 mol %, and an intrinsic viscosity [η] of from 0.5 to 5.0 dl/g, and (B) at least 10 ppm of a nucleating agent.

(30) The propylene-based polymer composition of above (29), wherein the α-olefin has at least 5 carbon atoms.

(31) The propylene-based polymer composition of above (29), in which the α-olefin is 1-butene and of which the tensile modulus (TM (MPa)) in the MD direction and the heat-sealing temperature (HST (° C.)) satisfy the following formula (6-I):

$$TM \geq 22 \times HST - 1850 \quad (6\text{-}I).$$

(32) The propylene-based polymer composition of above (29), of which the tensile modulus (TM (MPa)) in the MD direction and the heat-sealing temperature (HST (° C.)) satisfy the following formula (6-II):

$$TM \geq 22 \times HST - 1700 \quad (6\text{-}II).$$

(33) The propylene-based polymer composition of above (29), of which the boiling diethyl ether-soluble content (E (% by weight)) and the α-olefin content (α (mol %)) satisfy the following formula (6-III):

$$E \leq 0.2 \times \alpha + 1.0 \quad (6\text{-}III).$$

(34) Films as formed by casting the propylene-based polymer composition of any of above (29) to (33).

Figure 1:
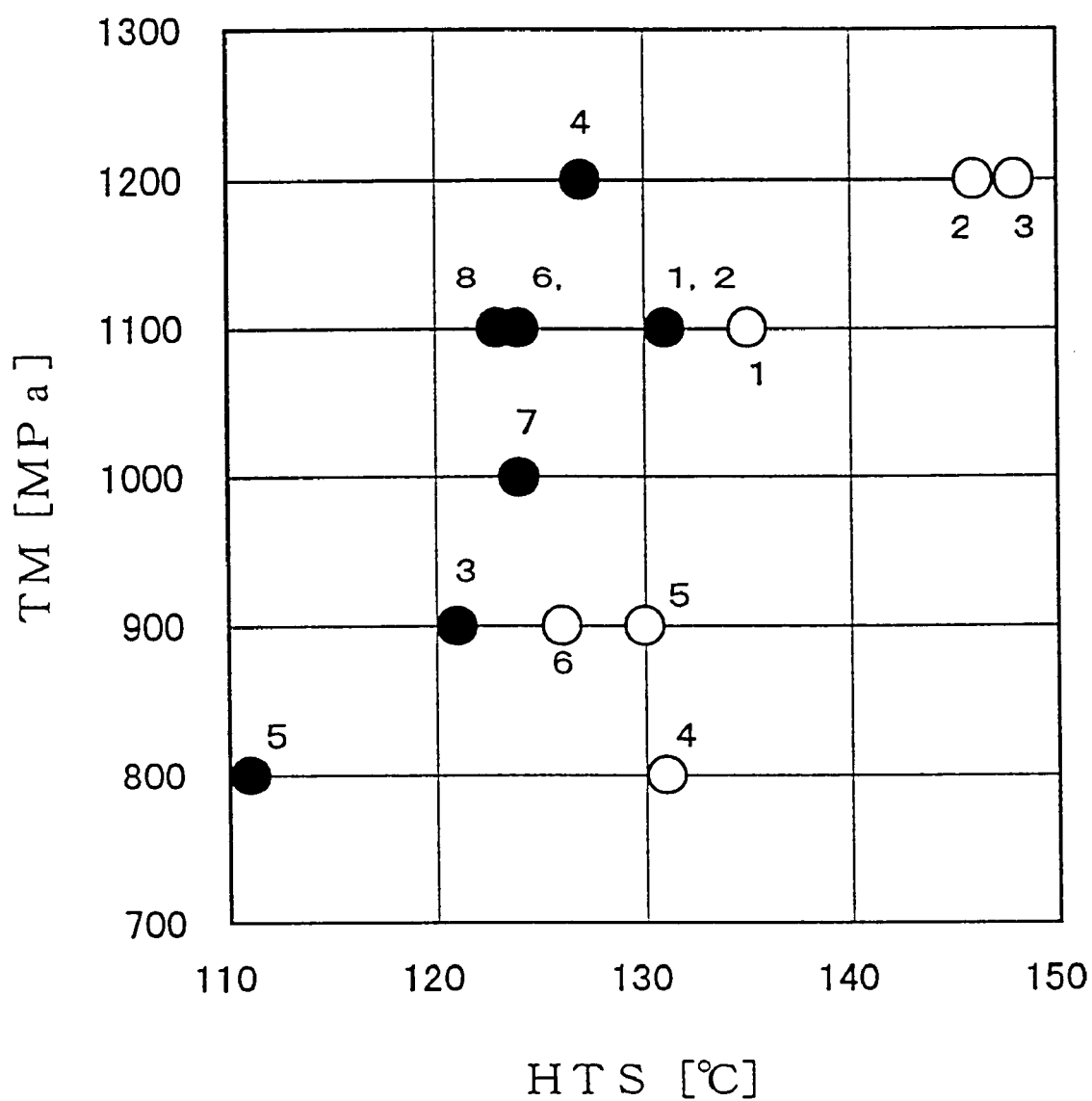
FIG. 1 indicates the relation between TM and HST in formula (II) in the first aspect of the invention.

In this, the black spots are for Examples and the white spots are for Comparative Examples; and the numerals given for those spots correspond to the respective numbers of Examples and Comparative Examples.

BEST MODES OF CARRYING OUT THE INVENTION

The invention is described in detail hereinunder. The first aspect of the invention includes two types of resin compositions.

The first resin composition is a propylene-based polymer composition comprising (1-A) a propylene homopolymer obtained through polymerization in the presence of a metallocene catalyst and having an isotactic pentad fraction (mmmm fraction) of from 80 to 99 mol %, a molecular weight distribution (Mw/Mn) of at most 3.5, and an intrinsic viscosity [η] of from 0.5 to 5.0 dl/g, and (1-B) at least 10 ppm of a nucleating agent.

The propylene homopolymer (1-A) in the first resin composition has an isotactic pentad fraction (mmmm fraction), a stereospecificity index of from 80 to 99 mol %, preferably from 85 to 97 mol %. If the isotactic pentad fraction of the homopolymer is smaller than 80 mol %, the toughness of the films of the composition will be low; but if larger than 99 mol %, the impact resistance of the films will be low. Therefore, polymers of which the isotactic pentad fraction oversteps the defined range are unfavorable to the invention. The isotactic pentad fraction (mmmm fraction) referred to herein is meant to indicate the proportion (mol %) of five propylene structural units having a meso structure (mmmm structure with all five methyl groups therein being aligned in the same direction) in a propylene-based polymer, and this is determined on the basis of the assignment of the peaks appearing in the $^{13}$C-NMR spectrum of the polymer, as proposed by Cheng, H. N. and Ewen, J. A., in Macromol. Chem., 190, 1350 (1989).

The propylene homopolymer for use herein has a molecular weight distribution (Mw/Mn) of at most 3.5, preferably at most 3.0, more preferably from 1.5 to 2.5. If the molecular weight distribution (Mw/Mn) of the homopolymer is larger than 3.5, the heat-sealability and even the anti-blocking properties of the composition will be low and poor.

The propylene homopolymer has an intrinsic viscosity [η] of from 0.5 to 5.0 dl/g, preferably from 0.5 to 3.0 dl/g, more preferably from 1 to 2.5 dl/g.

The propylene homopolymer for use in the invention may be prepared in various methods. Preferably, it is prepared through polymerization of propylene in the presence of a metallocene catalyst. Concretely, it is prepared by polymerizing propylene in the presence of a metallocene catalyst that comprises a compound of a transition metal of Group 4 of the Periodic Table having a cyclopentadienyl ring, and methylaluminoxane or an organoaluminium compound capable of reacting with the transition metal compound of Group 4 of the Periodic Table to form an ionic complex.

The compound of a transition metal of Group 4 of the Periodic Table having a cyclopentadienyl ring, which is an essential component of the catalyst, includes zirconium, titanium and hafnium compounds having, as the ligand, a polydendate coordination compound with at least two groups (selected from cycloalkadienyl groups and their derivatives, concretely from indenyl groups, substituted indenyl groups and their partial hydrides) being bonded to each other via a lower alkylene group or a silylene group therebetween. For example, the compound includes stereorigid chiral zirconium and hafnium compounds, such as ethylene-bis-(indenyl)zirconium dichloride described by H. H. Brintzinger, et al., in J. Organometal. Chem., 288, 63 (1985); ethylene-bis-(indenyl)hafnium dichloride described in J. Am. Chem. Soc., 109, 6544 (1987); dimethylsilylenebis(2,4-dimethylcyclopentadienyl)zirconium dichloride, dimethylsilylenebis(2,4,5-trimethylcyclopentadienyl)zirconium dichloride, and hafnium dichlorides corresponding to these complexes described by H. Yamazaki, et al., in Chemistry Letters, 1853 (1989).

Specific examples of the compounds are ethylenebis (indenyl)zirconium dichloride, ethylenebis(4,5,6,7- tetrahydro-1-indenyl)zirconium dichloride, ethylenebis(4-methyl-1-indenyl)zirconium dichloride, ethylenebis(5-methyl-1-indenyl)zirconium dichloride, ethylenebis(6-methyl-1-indenyl)zirconium dichloride, ethylenebis(7-methyl-1-indenyl)zirconium dichloride, ethylenebis(2,3-dimethyl-1-indenyl)zirconium dichloride, ethylenebis(4,7-dimethyl-1-indenyl)zirconium dichloride, ethylenebis(indenyl)hafnium dichloride, ethylenebis(4,5,6,7-tetrahydro-1-indenyl)hafnium dichloride, ethylenebis(4-methyl-1-indenyl)hafnium dichloride, ethylenebis(5-methyl-1-indenyl)hafnium dichloride, ethylenebis(6-methyl-1-indenyl)hafnium dichloride, ethylenebis(7-methyl-1-indenyl)hafnium dichloride, ethylenebis(2,3-dimethyl-1-indenyl)hafnium dichloride, ethylenebis(4,7-dimethyl-1-indenyl)hafnium dichloride, dimethylsilylenebis(indenyl)zirconium dichloride, dimethylsilylenebis(indenyl) hafnium dichloride, dimethylsilylenebis(4-methylindenyl) zirconium dichloride, dimethylsilylenebis(indenyl)hafnium dichloride, dimethylsilylenebis(2,4,5-trimethylcyclopentadienyl)zirconium dichloride, dimethylsilylenebis(2,4,5-trimethylcyclopentadienyl) hafnium dichloride, dimethylsilylenebis(2,4-dimethylcyclopentadienyl)zirconium dichloride, dimethylsilylenebis(2,4-dimethylcyclopentadienyl)hafnium dichloride, dimethylsilylenebis(3-methylcyclopentadienyl) zirconium dichloride, dimethylsilylenebis(3-methylcyclopentadienyl)hafnium dichloride, dimethylsilylenebis(2-methyl-4-phenylindenyl)zirconium dichloride, dimethylsilylenebis(benzoindenyl)zirconium dichloride, etc.

Further mentioned are (dimethylsilyl)(dimethylsilyl)-bis (indenyl)zirconium dichloride, (ethylene)(ethylene)-bis (indenyl)zirconium dichloride, (ethylene)(ethylene)-bis(3-methylindenyl)zirconium dichloride, (ethylene)(ethylene)-bis(4,7-dimethylindenyl)zirconium dichloride, etc.; and their derivatives having hafnium or titanium in place of zirconium.

As the compound capable of reacting with the transition metal compound of Group 4 of the Periodic Table to form an ionic complex, which is a catalyst promoter, preferred are tetra(pentafluorophenyl)borate anion-containing compounds such as triphenylcarbenium tetrakis(pentafluorophenyl) borate, N,N-dimethylanilinium tetrakis(pentafluorophenyl) borate, lithium tetrakis(pentafluorophenyl)borate; and tetra (pentafluorophenyl)aluminate anion-containing compounds such as triphenylcarbenium tetrakis(pentafluorophenyl) aluminate, N,N-dimethylanilinium tetrakis (pentafluorophenyl)aluminate, lithium tetrakis (pentafluorophenyl)aluminate.

As the organoaluminium compound, preferred are those having at least one Al—C bond in the molecule. Specific examples of the organoaluminium compounds of that type are trialkylaluminiums such as triethylaluminium, triisobutylaluminium, trihexylaluminium, etc.; dialkylaluminium halides such as diethylaluminium halides, diisobutylaluminium halides, etc.; mixtures of trialkylaluminiums and dialkylaluminium halides; alkylaluminoxanes such as tetraethyldialuminoxane, tetrabutylaluminoxane, etc.

Of those organoaluminium compounds, preferred are trialkylaluminiums, mixtures of trialkylaluminiums and dialkylaluminium halides, and alkylaluminoxanes; and more preferred are triethylaluminium, triisobutylaluminium, a mixture of triethylaluminium and diethylaluminium chloride, and tetraethyldialuminoxane. As the organoaluminium, preferred are triethylaluminium, triisobutylaluminium, etc.

The metallocene catalyst and/or its promoter for use herein may be carried on a carrier. The carrier includes organic compounds such as polystyrenes, etc.; inorganic oxides such as silica, alumina, etc.

The polymerization to give the polymer may be effected in any mode of bulk polymerization, solution polymerization, vapor-phase polymerization, suspension polymerization or the like, and may be effected either in a batchwise polymerization system or a continuous polymerization system.

If desired, pre-polymerization of a small amount of an α-olefin, such as ethylene, propylene, 1-butene, 4-methyl-1-pentene or the like may be effected prior to the polymerization to give the polymer. Accordingly, the propylene homopolymer of the component (1-A) includes propylene homopolymers as obtained by first pre-polymerizing a small amount (at most 0.5 mol % of the final resin) of an α-olefin such as ethylene, propylene or the like, followed by polymerizing propylene.

The polymerization temperature may fall generally between −50 and 250° C., but preferably between 0 and 150° C. The polymerization time may fall generally between 1 and 10 hours; and the pressure may fall generally between ordinary pressure and 300 kg/cm$^2$G.

The nucleating agent of the component (1-B) to be in the resin composition of the invention may be any one capable of readily inducing crystalline nuclei in the propylene-based polymer thereby to lower the degree of supercooling necessary for the start of polymer crystallization, without detracting from the physical properties of the polymer.

Specific examples of the nucleating agent for use in the invention are high-melting-point polymers, organic carboxylic acids and their metal salts, aromatic sulfonic acids and their metal salts, organic phosphoric acid compounds and their metal salts, dibenzylidene-sorbitol and its derivatives, partial metal salts of rhodinic acid, fine inorganic grains, imides, amides, quinacridones, quinones, and their mixtures.

The high-melting-point polymers include polyolefins such as polyethylene, polypropylene, etc.; polyvinylcycloalkanes such as polyvinylcyclohexane, polyvinylcyclopentane, etc.; poly-3-methylpentene-1, poly-3-methylbutene-1, polyalkenylsilanes, etc. The metal salts include aluminium benzoate, aluminium p-t-butylbenzoate, sodium adipate, sodium thiophenecarboxylate, sodium pyrrolecarboxylate, etc. The fine inorganic grains include talc, clay, mica, asbestos, glass fibers, glass flakes, glass beads, calcium silicate, montmorillonite, bentonite, graphite, aluminium powder, alumina, silica, diatomaceous earth, titanium oxide, magnesium oxide, pumice powder, pumice balloons, aluminium hydroxide, magnesium hydroxide, basic magnesium carbonate, dolomite, calcium sulfate, potassium titanate, barium sulfate, calcium sulfite, molybdenum sulfide, etc. Of those, preferred are metal salts of organic phosphoric acids of the following formula (1-I), as well as fine inorganic grains such as talc and the like, as they give few odors and therefore the propylene-based polymer composition of the invention comprising any of them is favorable to use for edibles.

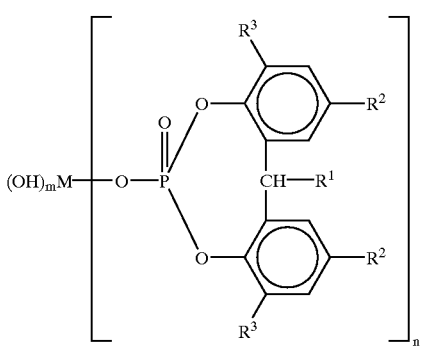

(1-I)

wherein $R^1$ represents a hydrogen atom, or an alkyl group having from 1 to 4 carbon atoms; $R^2$ and $R^3$ each represent a hydrogen atom, an alkyl group having from 1 to 12 carbon atoms, cycloalkyl group, aryl group or aralkyl group; M represents any one of an alkali metal, an alkaline earth metal, aluminium or zinc; when M is an alkali metal, then m is 0, and n is 1; when M is a divalent metal, then n is 1 or 2, and, in this case, m is 1 when n is 1, and m is 0 when n is 2; and when M is aluminium, then m is 1, and n is 2.

Films of the propylene-based polymer composition that contains fine inorganic grains such as talc or the like have good slip characteristics, and their secondary workability for forming into bags or for printing thereon is good. Therefore, they are favorable to general-purpose wrapping and packaging films of all types that are worked in high-speed film-working systems such as various types of automatic filling and lamination packaging systems, etc.

Films of the propylene-based polymer composition that contains dibenzylidene-sorbitol or its derivative as the nucleating agent have especially good transparency, and their display effect is significant. Therefore, they are favorable to wrapping and packaging toys, stationery, etc.

Specific examples of the dibenzylidene-sorbitol derivatives are 1,3:2,4-bis(o-3,4-dimethylbenzylidene)sorbitol, 1,3:2,4-bis(o-2,4-dimethylbenzylidene)sorbitol, 1,3:2,4-bis(o-4-ethylbenzylidene)sorbitol, 1,3:2,4-bis(o-4-chlorobenzylidene)sorbitol, 1,3:2,4-dibenzylidene-sorbitol, etc.

Films of the propylene-based polymer composition that contains an amide compound as the nucleating agent are highly tough and are confronted little with the problem of wrinkle formation when wound in a high-speed bag-forming machine. Therefore, they are favorable to general-purpose films of all types to be worked in high-speed bag-forming machines.

Specific examples of the amide compounds are adipic acid dianilide, suberic acid dianilide, etc.

The amount of the nucleating agent to be added to the propylene-based polymer is generally at least 10 ppm, preferably from 50 to 3000 ppm. If its amount added is smaller than 10 ppm, the low-temperature heat-sealability of the composition could not be improved. On the other hand, even if its amount added is too much, such will be meaningless for augmenting the effect of the nucleating agent added.

Though depending on its type, it is generally desirable that the amount of the nucleating agent to be added is at most 1000 ppm, more preferably at most 500 ppm, in view of the transparency and the impact resistance of the propylene-based resin composition. More concretely, it is desirable that the amount of the sorbitol-type nucleating agent, dibenzylidene-sorbitol to be added is at most 3000 ppm, more preferably at most 1500 ppm, even more preferably at most 500 ppm. The amount of bis(p-methylbenzylidene)sorbitol or bis(dimethylbenzylidene)sorbitol is preferably at most 1200 ppm, more preferably at most 600 ppm, even more preferably at most 300 ppm. Regarding metal salts of organic phosphoric acids, the amount of sodium salt of an organic phosphoric acid is preferably at most 500 ppm, more preferably at most 250 ppm, even more preferably at most 125 ppm. The amount of Al salt of an organic phosphoric acid is preferably at most 1900 ppm, more preferably at most 1500 ppm, even more preferably at most 500 ppm. As talc, usable is Talc MMR from Asada Milling. Its amount is preferably at most 4000 ppm, more preferably at most 2000 ppm, even more preferably at most 1000 ppm. As the amide compound, usable is N Jester NU-100 from Shin-Nippon Rika. Its amount is preferably at most 3000 ppm, more preferably at most 1500 ppm, even more preferably at most 500 ppm.

The second resin composition of the first aspect of the invention is a propylene-based polymer composition comprising (1-A') a propylene-based random copolymer obtained through polymerization of propylene, and ethylene and/or an α-olefin having from 4 to 20 carbon atoms in the presence of a metallocene catalyst, and having a propylene-derived structural unit content of from 80 to 100 mol %, an ethylene and/or C4–20 α-olefin-derived structural unit content of from 0 to 20 mol %, a molecular weight distribution (Mw/Mn) of at most 3.5, and an intrinsic viscosity [η] of from 0.5 to 5.0 dl/g, and (1-B) at least 10 ppm of a nucleating agent.

The component (1-A') to be in the resin composition is a propylene-based random copolymer, of which the ethylene and/or C4–20 α-olefin-derived structural unit content is preferably at most 40% by weight, more preferably from 0 to 20 mol %, evenmorepreferably from 0 to 10 mol %. If the ethylene and/or C4–20 α-olefin-derived structural unit content of the propylene-based random copolymer is larger than 20 mol %, the toughness of the films of the composition will be low and unsatisfactory.

The molecular weight distribution (Mw/Mn) of the propylene-based random copolymer is preferably at most 3.5, more preferably at most 3.0, even more preferably at most 2.5. If the molecular weight distribution (Mw/Mn) of the copolymer is larger than 3.5, the heat-sealability and the anti-blocking properties of the composition will be low and poor.

The intrinsic viscosity [η] of the propylene-based random copolymer generally falls between 0.5 and 5.0 dl/g, preferably between 0.5 and 3.0 dl/g, more preferably between 1 and 3 dl/g, even more preferably between 1.0 and 2.5 dl/g.

Also preferably, the boiling diethyl ether extraction of the copolymer is preferably at most 2.6% by weight, more preferably at most 2.3% by weight.

The propylene-based random copolymer to be in the resin composition is prepared by catalytically mixing propylene with ethylene and/or an α-olefin having from 4 to 20 carbon atoms. It is not necessary that the blend ratio of the monomers constituting the reaction system is kept all the time constant. As the case may be, the monomers may be fed into a reactor in a predetermined ratio, or the blend ratio of the monomers may be varied with the lapse of reaction time. In consideration of the copolymerization ratio, any of the monomers may be divided into plural portions, and the plural portions may be intermittently added to the reaction system at different times. It is also possible to continuously introduce a mixed monomer gas having a predetermined blend ratio into the reaction system while the excess gas is continuously discharged from the system through a degassing valve. In this case, the blend ratio of the monomers in the reaction system could be kept all the time constant. As a molecular weight-controlling agent, hydrogen may be introduced into the reaction system.

Like the propylene homopolymer to be in the first resin composition, the propylene-based random copolymer of the component (1-A') to be in this resin composition may be prepared through polymerization of propylene with an α-olefin such as that mentioned above, in the presence of a metallocene catalyst that comprises a compound of a transition metal of Group 4 of the Periodic Table having a cyclopentadienyl ring, and methylaluminoxane or an organoaluminium compound capable of reacting with the transition metal compound of Group 4 of the Periodic Table to form an ionic complex.

Specific examples of the metallocene catalyst and its promoter to be used herein may be the same as those mentioned above for the propylene homopolymer to be in the first resin composition, and their detailed description is omitted herein.

The propylene-based polymer may be blended with any other polymer within the range that satisfies the formula (I) mentioned hereinunder. The other polymer includes high-density polyethylene, low-density polyethylene, linear low-density polyethylene, conventional propylene random copolymers and block copolymers, etc.

The polymerization method and also the conditions for pre-polymerization and polymerization for the propylene-based random copolymer may be the same as those for the propylene homopolymer to be in the first resin composition.

The nucleating agent (1-B) to be in this resin composition is the same as that to be in the first resin composition, and its detailed description is omitted herein.

In this resin composition, the amount of the nucleating agent is at least 10 ppm relative to the propylene-based random copolymer. The details of the preferred range of the amount of the nucleating agent may be the same as those mentioned hereinabove for the first resin composition, and are omitted herein.

Preferably, the first and second resin compositions of the invention satisfy the following formula (1-II):

$$TM \geq 22 \times HST - 1850 \quad (1\text{-}II)$$

wherein TM (MPa) indicates the tensile modulus of the compositions in the MD direction and HST (° C.) indicates the heat-sealing temperature thereof, more preferably, $$TM \geq 22 \times HST - 1800 \quad (1\text{-}II)'$$

even more preferably, $$TM \geq 22 \times HST - 1750 \quad (1\text{-}II)''.$$

The tensile modulus (TM) of the compositions in the MD direction is measured in a tensile test according to JIS K-7127, for which the cross-head speed is 500 mm/min. In the test, the film sample is measured in the MD direction (machine direction in which the sample is taken up), and its thickness is typically 25 μm.

The heat-sealing temperature (HST) is measured according to JIS Z-1707. The details of the condition for the test are described in Examples.

The first and second resin compositions of the invention comprises a propylene-based polymer prepared in the presence of a metallocene catalyst such as that mentioned hereinabove, and a nucleating agent, in which the amount of the nucleating agent is generally at least 10 ppm. Films of the resin compositions well-balanced and high-level toughness and heat-sealability.

The second aspect of the invention is described in detail hereinunder.

The resin composition of the second aspect of the invention is a polypropylene-based resin composition comprising (2-A) from 50 to 99 parts by weight of a propylene homopolymer obtained through polymerization in the presence of a metallocene catalyst and having an isotactic pentad fraction (mmmm fraction) of from 80 to 99 mol %, an intrinsic viscosity [η] of from 1.0 to 2.0 dl/g, and a molecular weight distribution (Mw/Mn) of at most 3.5, and (2-B) from 1 to 50 parts by weight of a propylene homopolymer obtained through polymerization in the presence of a metallocene catalyst and having an intrinsic viscosity [η] of from 0.01 to 1.0 dl/g, and a molecular weight distribution (Mw/Mn) of at most 3.5.

The second aspect of the invention is based on the finding that the propylene homopolymer of the component (2-B) functions as the nucleating agent to be in the first aspect of the invention.

The component (2-A) to be in the invention is a propylene homopolymer obtained through polymerization in the presence of a metallocene catalyst, and it may be a propylene-based polymer prepared through pre-polymerization of propylene with a small amount (at most 0.5 mol %) of ethylene or an α-olefin having from 4 to 20 carbon atoms. The polymer has an isotactic pentad fraction (mmmm fraction), a stereospecificity index of polypropylene, of from 80 to 99 mol %, preferably from 85 to 97 mol %, and has an intrinsic viscosity [η] of from 1.0 to 2.0 dl/g, preferably from 1.5 to 1.8 dl/g, and a molecular weight distribution (Mw/Mn) of at most 3.5, preferably at most 3.0.

If the isotactic pentad fraction of the homopolymer is smaller than 80 mol %, the toughness of the films of the composition will be low; but if larger than 99 mol %, the impact resistance of the films will be low.

If the intrinsic viscosity [η] of the homopolymer is smaller than 1.0 dl/g, the workability of the composition into films will be poor; but if larger than 2.0 dl/g, the fluidity of the composition will be low and the composition will be difficult to mold.

If the molecular weight distribution (Mw/Mn) of the homopolymer is larger than 3.5, the heat-sealability and even the anti-blocking properties of the composition will be low and poor.

The propylene-based polymer of the component (2-A) to be used in the invention may be prepared by the use of the same catalyst as that for the propylene homopolymer to be in the first resin composition of the first aspect of the invention, and the detailed description of the catalyst for the polymer is omitted herein.

The polymerization temperature for the polymer may fall generally between −50 and 250° C., preferably between 0 and 150° C.; the polymerization time may fall generally between 1 and 10 hours; and the pressure may fall generally between normal pressure and 300 kg/cm²G.

The propylene-based polymer of the component (2-A) to be used in the invention may be prepared under the same polymerization condition as that for the propylene homopolymer to be in the first resin composition of the first aspect of the invention. The intrinsic viscosity of the polymer may be controlled by varying the polymerization temperature and the partial hydrogen pressure during the polymerization reaction for the polymer. Concretely, the propylene-based polymer of the component (2-A) may be produced through polymerization at a polymerization temperature falling between 0 and 100° C., preferably between 30 and 90° C., and under a partial hydrogen pressure falling between 0 and 5 kg/cm$^2$G, preferably between 0 and 2.5 kg/cm$^2$G.

The component (2-B) for use in the invention is a propylene homopolymer produced through polymerization in the presence of a metallocene catalyst, and it may be a propylene-based polymer prepared through prepolymerization of propylene with a small amount (at most 0.5 mol %) of ethylene or an α-olefin having from 4 to 20 carbon atoms. The polymer has an intrinsic viscosity [η] of from 0.01 to 1.0 dl/g, preferably from 0.1 to 0.8 dl/g, and a molecular weight distribution (Mw/Mn) of at most 3.5, preferably at most 3.0.

If the intrinsic viscosity [η] of the homopolymer is smaller than 0.01 dl/g, films of the composition will be sticky; but if larger than 1.0 dl/g, the heat-sealability of the composition will be poor.

If the molecular weight distribution (Mw/Mn) of the homopolymer is larger than 3.5, the heat-sealability and even the anti-blocking properties of the composition will be low and poor.

From the viewpoint of the toughness of films of the composition, it is desirable that the component (2-B) has an isotactic pentad fraction (mmmm fraction) of from 80 to 99 mol %.

Basically, the same metallocene catalyst and promoter as those for the propylene-based polymer of the component (2-A) mentioned above may be used in polymerization to give the component (2-B), and the polymerization to give the component (2-B) may be effected under the same condition as that for the component (2-A). Concretely, the propylene-based polymer of the component (2-B) may be produced through polymerization at a polymerization temperature falling between 50 and 150° C., preferably between 50 and 100° C., and under a hydrogen partial pressure falling between 0.1 and 10 kg/cm$^2$G, preferably between 0.5 and 5 kg/cm$^2$G.

The blend ratio (by weight) of the component (2-A) to the component (2-B) in the propylene-based polymer composition of the invention falls between 99/1 and 50/50, preferably between 99/1 and 75/25, more preferably between 99/1 and 90/10. If the proportion of the component (2-B) is smaller than 1%, the heat-sealability of the composition will be poor; but if larger than 50%, the tensile modulus and the impact resistance of the composition will be poor.

The third aspect of the invention is described in detail hereinunder.

The propylene-based resin of the third aspect of the invention comprises (3-A) from 55 to 99 parts by weight of a copolymer of propylene and an α-olefin having at least 5 carbon atoms, and (3-B) from 1 to 45 parts by weight of a propylene-based polymer of which the crystallization temperature as measured through differential scanning calorimetry is higher than that of (3-A).

The copolymer (3-A) for use in the invention is a copolymer of propylene and an α-olefin having at least 5 carbon atoms. If propylene homopolymer is used in place of the copolymer, the low-temperature heat-sealability of the resin composition will be poor. The α-olefin having at least 5 carbon atoms is not specifically defined, concretely including 1-pentene, 4-methyl-1-pentene, 1-hexene, 1-heptene, 1-octene, 1-nonene, 1-decene, 1-dodecene, 1-tridecene, 1-tetradecene, 1-pentadecene, 1-hexadecene, 1-heptadecene, 1-octadecene, etc. Of those, preferred are 1-octene, 1-dodecene and 1-decene. Ethylene units or 1-butene units from the corresponding α-olefins are inferior to the units from α-olefins having at least 5 carbon atoms, since the former are not so much effective for lowering the melting point of polypropylene as compared with the latter, and therefore the effect of the former to improve the low-temperature heat-sealability of the resin composition is not satisfactory. Preferably, the copolymer (3-A) for use in the invention satisfies the following requirements (A-i) and (A-ii):

(A-i) The amount (W(A)p) of its fraction eluted within the temperature range between (Tp–5)° C. and (Tp+5)° C. is at least 70% by weight, with Tp being the peak temperature for essential elution in the temperature-programmed fractionation chromatography (TREF) of the copolymer, and (A-ii) The amount (W(A)0) of its fraction eluted within the temperature range not higher than 0° C. in the temperature-programmed fractionation chromatography of the copolymer is at most 3% by weight.

More preferably, W(A)p is at least 75% by weight, even more preferably at least 80% by weight. If W(A)p is smaller than 70% by weight, the compositional distribution of the copolymer will be broad, and the TREF curve will give any other peaks in addition to the essential elution peak or the essential elution peak appearing in the curve will trail long to the higher-temperature side or to the lower-temperature side. If the essential elution peak trails long to the higher-temperature side, or if some side peaks appear in the higher-temperature side relative to the essential elution peak, the heat-sealability of the composition is often poor. On the other hand, if the essential elution peak trails long to the lower-temperature side, or if some side peaks appear in the lower-temperature side relative to the essential elution peak, films, fibers, sheets and moldings of the composition will be sticky. W(A)0 is preferably at most 2% by weight, more preferably at most 1.5% by weight. If W(A)0 is larger than 3% by weight, films, fibers, sheets and moldings of the composition will be sticky and undesirable.

Also preferably, the copolymer (3-A) for use in the invention satisfies at least any one of the following (A-iii), (A-iv) and (A-v):

(A-iii) The content of α-olefin units having at least 5 carbon atoms (a mol %) in the copolymer (3-A) is from 0.1 mol % to 12 mol %;

(A-iv) The stereospecificity index (P) of the copolymer (3-A) is at least 85 mol %; and (A-v) The intrinsic viscosity ([η]) of the copolymer (3-A), as measured in decalin at 135° C., is from 0.5 to 3.0 g/dl.

More preferably, the content of α-olefin units having at least 5 carbon atoms in the copolymer (3-A) is from 0.2 mol % to 11 mol %, even more preferably from 0.3 mol % to 10 mol %. If the α-olefin unit content of the copolymer (3-A) is smaller than 0.1 mol %, the heat-sealability of the composition could not be improved to a satisfactory degree; but if larger than 12 mol %, the crystallinity of the copolymer will be low and the toughness of the composition will be poor. Therefore, the content overstepping the range is undesirable. (P) of the copolymer is more preferably at least 90 mol %, even more preferably at least 95 mol %. If (P) is smaller than 85 mol %, the crystallinity of the copolymer will be low and the toughness of the composition will be poor. (P) indicates the isotactic fraction of the triad units in the copolymer as measured through $^{13}$C-NMR, and the details of the method of measuring it are shown in the section of Examples. [η] of the copolymer preferably falls between 0.5 and 3.0 dl/g. If [η] oversteps the range, molding the composition will often end in failure.

Also preferably, the melting point (Tma (° C.)) of the copolymer (3-A) as measured through differential scanning calorimetry satisfies the following formula:

$$Tma \leq 140° \text{ C., and } Tma \leq 160-7\alpha \qquad (3\text{-ii}),$$

more preferably, $$Tma \leq 130° \text{ C., and } Tma \leq 155-7\alpha \qquad (3\text{-iii}),$$

even more preferably, $$Tma \leq 120° \text{ C., and } Tma \leq 150-7\alpha \qquad (3\text{-iv}),$$

still more preferably, $$Tma \leq 115° \text{ C., and } Tma \leq 145-7\alpha \qquad (3\text{-v}).$$

If Tma oversteps the defined range, the low-temperature heat-sealability of the composition will be poor.

The propylene-based polymer (3-B) for use in the invention has a crystallization temperature higher than that of the copolymer (3-A), as measured through differential scanning calorimetry. If a propylene-based polymer, of which the crystallization temperature as measured through differential scanning calorimetry is lower than that of the copolymer (3-A), is used as the component (3-B), the moldability of the composition could not be improved.

The composition and the structure of the propylene-based polymer (3-B) are not specifically defined. Any suitable one having a higher degree of crystallinity than the copolymer (3-A) may be selected from polypropylene homopolymer and copolymers of propylene with other α-olefins, for use as the component (3-B). For example, as the polypropylene homopolymer, usable is isotactic polypropylene having a high degree of stereospecificity, such as that having an isotactic pentad fraction, a stereospecificity index, of at least 85 mol %, preferably at least 90 mol %, more preferably at least 95 mol %.

As the copolymers of propylene with other α-olefins, preferred are ethylene/propylene copolymers, ethylene/1-butene/propylene copolymers, 1-butene/propylene copolymers, etc. As the ethylene/propylene copolymers, especially preferred are those described in Japanese Patent Application Nos. 288052/1996 and 313210/1996.

As the ethylene/1-butene/propylene copolymers, preferred are those described in Japanese Patent Application Nos. 209210/1997 and 222356/1997.

These copolymers of propylene and other α-olefins are characterized by high stereospecificity of the propylene chains constituting them and by high crystallinity despite of their relatively low melting point.

Also preferably, the propylene-based polymer (3-B) has a melt index falling between 0.1 and 100 g/min.

The propylene-based resin of the invention comprises from 55 to 99 parts by weight of the copolymer (3-A) and from 1 to 45 parts by weight of the propylene-based polymer (3-B), but preferably from 65 to 98 parts by weight of the copolymer (3-A) and from 2 to 35 parts by weight of the propylene-based polymer (3-B), more preferably from 75 to 95 parts by weight of the copolymer (3-A) and from 5 to 25 parts by weight of the propylene-based polymer (3-B). If the proportion of the copolymer (3-A) is smaller than 55 parts by weight, the low-temperature heat-sealability of the resin composition could not be improved to a satisfactory degree.

On the other hand, if the proportion of the propylene-based polymer (3-B) is smaller than 1 part by weight, the moldability of the resin composition could not be improved to a satisfactory degree.

Also preferably, the propylene-based resin of the invention satisfies the following formula:

$$Tcb - Tca \geq 20 \qquad (3\text{-i})$$

wherein Tca (° C.) indicates the crystallization temperature of the copolymer (3-A), and Tcb (° C.) indicates the crystallization temperature of the propylene-based polymer (3-B), both measured through differential scanning calorimetry, more preferably, $$Tcb - Tca \geq 30 \qquad (3\text{-vi}),$$

even more preferably, $$Tcb - Tca \geq 40 \qquad (3\text{-vii}).$$

If the value of Tcb−Tca is small, the moldability of the resin composition could not be improved to a satisfactory degree.

Also preferably, the propylene-based polymer (3-B) satisfies the following formula:

$$Tmb - Tcb \leq 50 \qquad (3\text{-viii})$$

wherein Tmb (° C.) and Tcb (° C.) each indicate the melting point and the crystallization temperature, respectively, of the polymer (3-B), both measured through differential scanning calorimetry, more preferably, $$Tmb - Tcb \leq 45 \qquad (3\text{-ix}),$$

even more preferably, $$Tmb - Tcb \leq 40 \qquad (3\text{-x}).$$

The smaller value of Tmb−Tcb is preferred, as the negative influence of the polymer (3-B) on the low-temperature heat-sealability of the resin composition could be reduced more.

Also preferably, the propylene-based resin of the invention satisfies the following requirements (i), (ii) and (iii) in its temperature-programmed fractionation chromatography:

(i) The amount (W(H)p) of its fraction eluted within the temperature range between (Tp−5)° C. and (Tp+5)° C. is at least 65% by weight, with Tp being the peak temperature for essential elution;

(ii) The amount (W(H)0) of its fraction eluted within the temperature range not higher than 0° C. is at most 3% by weight; and (iii) The amount (W(H)10) of its fraction eluted within the temperature range not lower than Tp+10° C. is from 1 to 45% by weight of all eluates.

More preferably, W(H)p is at least 70% by weight, even more preferably at least 75% by weight, still more preferably at least 80% by weight. If W(H)p is smaller than 65% by weight, the low-temperature heat-sealability of the resin composition will be poor.

Also more preferably, W(H)0 is at most 2% by weight, even more preferably at most 1.5% by weight. If W(H)0 is larger than 3% by weight, the anti-blocking properties of the resin composition will be not good.

Also more preferably, W(H)10 falls between 2 and 35% by weight, even more preferably between 3 and 25% by weight, still more preferably between 4 and 20% by weight. If W(H)10 is smaller than 1% by weight, molding the resin composition will end in failure; but if larger than 45% by weight, the low-temperature heat-sealability of the resin composition will be poor.

Also preferably, the peak top temperature of the propylene-based resin of the invention is not lower than 85° C. on the highest temperature side in the crystallization curve of the resin as measured through differential scanning calorimetry, more preferably not lower than 90° C., even more preferably not lower than 95° C., still more preferably not lower than 100° C. If the peak top temperature of the resin on the highest temperature side in the crystallization curve is lower than 85° C., the moldability of the resin composition could not be improved to a satisfactory degree.

Also preferably, the peak top temperature of the propylene-based resin of the invention is not higher than 150° C. on the lowest temperature side in the melting curve of the resin as measured through differential scanning calorimetry, more preferably not higher than 140° C., even more preferably not higher than 130° C., still more preferably not higher than 120° C. If the peak top temperature of the resin on the lowest temperature side in the melting curve is higher than 150° C., the low-temperature heat-sealability of the resin composition will be poor.

In the propylene-based resin of the invention, the copolymer (3-A) is prepared through polymerization, for example, in the methods of Examples, which, however, are not limitative. Any and every method capable of producing the copolymer as above is employable herein with no specific limitation.

As the catalyst for the polymerization to give the copolymer, preferred are metallocene catalysts comprising a combination of a metallocene transition metal compound with an organoaluminium compound or a boron compound, etc. The metallocene transition metal compound includes transition metal compounds of Group 4 of the Periodic Table, specifically those with titanium, zirconium of hafnium, to which is/are bonded one or two groups selected from cyclopentadienyl groups, substituted cyclopentadienyl groups, indenyl groups, substituted indenyl groups, tetrahydroindenyl groups, substituted tetrahydroindenyl groups, fluorenyl groups and substituted fluorenyl groups, or to which is bonded a crosslinked group of two of those groups as crosslinked via covalent bonding, and which have a ligand containing any of hydrogen atoms, oxygen atoms, halogen atoms, alkyl groups, alkoxy groups, aryl groups, acetylacetonato groups, carbonyl groups, and nitrogen, oxygen, sulfur, phosphorus and silicon atoms.

The organoaluminium compound includes various types of aluminoxane compounds. Especially preferred is methylaluminoxane. In addition, any other organoaluminium compounds such as trimethylaluminium, triethylaluminium, triisobutylaluminium, diethylaluminium dichloride and the like may be combined with the transition metal compound.

As the ionizing agent, preferred are boron compounds. The boron compounds include trialkyl-substituted ammonium salts such as triethylammonium tetraphenyl borate; N,N-dialkylanilinium salts such as N,N-dimethyltetraphenyl borate; and phenylboron compounds such as trispentafluorophenylboron.

The metallocene catalyst and/or the organoaluminium compound may be carried on some carrier. The carrier includes organic compounds such as styrene, etc.; and inorganic compounds such as silica, alumina, etc.

As the case may be, the polymerization to give the copolymer (3-A) may comprise pre-polymerization of propylene with a small amount of an α-olefin, such as ethylene, propylene, 1-butene or even an α-olefin having at least 5 carbon atoms.

The copolymerization of propylene with an α-olefin having at least 5 carbon atoms to give the copolymer is not specifically defined, and may be effected in any mode of bulk polymerization, solution polymerization, vapor-phase polymerization, suspension polymerization or the like. It may be effected either in a batchwise polymerization system or a continuous polymerization system.

Feeding monomers to the reaction system is not also specifically defined, and may be effected in various methods. It is not necessary that the blend ratio of the monomers constituting the reaction system is kept all the time constant. As the case may be, the monomers may be fed into a reactor in a predetermined ratio, or the blend ratio of the monomers may be varied with the lapse of reaction time. In consideration of the copolymerization ratio, any of the monomers may be divided into plural portions, and the plural portions may be intermittently added to the reaction system at different times. It is also possible to continuously introduce a mixed monomer gas having a predetermined blend ratio into the reaction system while the excess gas is continuously discharged from the system through a degassing valve. In this case, the blend ratio of the monomers in the reaction system could be kept all the time constant. As a molecular weight-controlling agent, hydrogen may be introduced into the reaction system.

The polymerization condition is not also specifically defined, and any conditions like those in known methods are employable herein. For example, the polymerization temperature may fall generally between −50 and 250° C., preferably between 0 and 150° C.; and the polymerization pressure may fall between ordinary pressure and 300 kg/cm$^2$G. The polymerization time may fall between 1 minute and 10 hours or so.

In the propylene-based resin of the invention, the propylene-based polymer (3-B) is prepared through polymerization, for example, in the methods of Examples, which, however, are not limitative. Any and every method capable of producing the propylene-based polymer as above is employable herein with no specific limitation.

To produce the propylene-based polymer (3-B), for example, preferably used are catalysts comprising a solid catalyst component with essential ingredients of magnesium, titanium and halogen, an organometallic compound catalyst component such as an organoaluminium compound or the like, and an electron donor compound catalyst component such as a silane compound or the like. For this, also preferred are metallocene catalysts comprising a combination of a metallocene transition metal compound with an organoaluminium compound or a boron compound, etc., such as those mentioned above.

The polymerization condition is not also specifically defined, and any conditions like those in known methods are employable herein. For example, the polymerization temperature may fall between 20 and 150° C.; and the polymerization pressure may fall between atmospheric pressure and 40 kg/cm$^2$G. The polymerization time may fall between 1 minute and 10 hours or so. If desired, hydrogen may be used as a molecular weight-controlling agent. As the case may be, the polymer may be copolymerized with comonomers of ethylene, 1-butene, α-olefins having at least 5 carbon atoms, etc.

The propylene-based resin of the invention is obtained by blending the copolymer (3-A) and the propylene-based polymer (3-B). Blending them is not specifically defined, and may be effected in any desired manner. In the following Examples, the copolymer (3-A) and the propylene-based polymer (3-B) are prepared separately, and the two are blended to obtain the resin composition. However, the method is not limitative. Another method different from this is also employable to obtain the resin mixture. For example, a propylene-based polymer (3-B) is prepared through polymerization in a first reactor, and this is transferred into a second reactor. In the second reactor in that condition, propylene is polymerized with an α-olefin having at least 5 carbon atoms. In this method, it is not always necessary that the catalyst in the first-stage reaction is the same as that in the second-stage reaction. Any desired catalyst favorable to each reaction may be used in any desired manner.

The fourth aspect of the invention is described hereinunder.

The first embodiment of the fourth aspect of the invention is a propylene-based random copolymer of propylene and an α-olefin having at least 5 carbon atoms, which satisfies the following formula (4-I):

$$Tm \leq 140, \text{ and } Tm \leq 160-7\alpha \qquad (4\text{-I})$$

wherein Tm (° C.) indicates the melting point of the copolymer measured through differential scanning calorimetry, and a (mol %) indicates the content of α-olefin units having at least 5 carbon atoms in the copolymer;

and satisfies the following formula (II):

$$Tc \geq 0.75Tm-15 \qquad (4\text{-II})$$

wherein Tc (° C.) and Tm (° C.) each indicate the crystallization temperature and the melting point, respectively, of the copolymer both measured through differential scanning calorimetry.

The α-olefin having at least 5 carbon atoms to be used in producing the propylene-based random copolymer of this embodiment includes 1-pentene, 4-methyl-1-pentene, 1-hexene, 1-octene, 1-decene, 1-dodecene, 1-tetradecene, 1-hexadecene, 1-octadecene, 1-eicosene, etc. In this embodiment, used are one or more of these α-olefins. Preferably used is at least one of 1-octene, 1-decene and 1-dodecene.

Tm (° C.) and α (mol %) of the propylene-based random copolymer of the invention must satisfy the following formula (4-I):

$$Tm \leq 140, \text{ and } Tm \leq 160-7\alpha \qquad (4\text{-I}).$$

If its Tm is above the value of 140 and "160−7α", the copolymer could not have well-balanced low-temperature heat-sealability and toughness. In view of the balance of the physical properties of the copolymer, it is desirable that Tm satisfies the following:

$$Tm \leq 130, \text{ and } Tm \leq 155-7\alpha,$$

more preferably, $$Tm \leq 120, \text{ and } Tm \leq 150-7\alpha,$$

even more preferably, $$Tm \leq 115, \text{ and } Tm \leq 145-7\alpha.$$

Tc (° C.) and Tm (° C.) of the copolymer must satisfy the following formula (4-II):

$$Tc \geq 0.75Tm-15 \qquad (4\text{-II}).$$

If Tc is smaller than "0.75Tm−15", molding the copolymer will often end in failure. In order to prevent it from giving failed moldings, it is desirable that the copolymer satisfies the following:

$$Tc \geq 0.75Tm-10,$$

more preferably, $$Tc \geq 0.75Tm-5.$$

It is desirable that the content of α-olefin units having at least 5 carbon atoms in the propylene-based random copolymer of the invention falls between 0.1 and 12 mol %, more preferably between 0.2 and 11 mol %, even more preferably between 0.3 and 10 mol %. If the content is smaller than 0.1 mol %, the low-temperature heat-sealability of the copolymer could not be improved to a satisfactory degree; but if larger than 12 mol %, the crystallinity and therefore the toughness of the copolymer will be low.

Preferably, the propylene-based random copolymer of the invention has a stereospecificity index, an isotactic fraction (P) of triad units as measured through $^{13}$C-NMR, of at least 85 mol %, more preferably at least 90 mol %, even more preferably at least 95 mol %. If the isotactic fraction (P) is smaller than 85 mol %, the crystallinity and therefore the toughness of the copolymer will be low. The method of determining the isotactic fraction (P) is described in the following Examples.

Also preferably, the propylene-based random copolymer of the invention has an intrinsic viscosity [η], as measured in decalin at 135° C., of from 0.5 to 3 dl/g, more preferably from 0.6 to 2.9 dl/g. If its intrinsic viscosity [η] oversteps the defined range, forming the copolymer into films will often end in failure.

To produce the propylene-based random copolymer of the invention, various types of metallocene catalysts can be used. Preferably used are metallocene catalysts comprising a combination of a metallocene transition metal compound with an organoaluminium compound or an ionizing agent (e.g., boron compound), etc. The metallocene catalysts and the polymerization conditions for the copolymer may be the same as those mentioned hereinabove for the third aspect of the invention, and their detailed description is omitted herein.

The second embodiment of the fourth aspect of the invention is a propylene-based random copolymer composition comprising (4-A) a propylene-based random copolymer of propylene and an α-olefin having at least 5 carbon atoms, and (4-B) a substance having the capability of nucleation.

The substance having the capability of nucleation for the component (4-B) (this may be hereinafter referred to as a "nucleating agent") may be a substance capable of readily inducing crystalline nuclei in a propylene-based polymer to thereby reduce the degree of supercooling necessary for the polymer crystallization but not detracting from the physical properties of the polymer at all.

The nucleating agent to be in the composition may be any one capable of readily inducing crystalline nuclei in the propylene-based polymer thereby to lower the degree of supercooling necessary for the start of polymer crystallization, without detracting from the physical properties of the polymer. Its specific examples and its amount to be added to the polymer may be the same as those mentioned hereinabove, and their detailed description is omitted herein.

The propylene-based random copolymer composition of this embodiment, which comprises the component (4-A) and the component (4-B), must satisfy the formula (4-I) that indicates the relationship between the melting point (Tm (° C.)) of the composition (this is measured through differential scanning calorimetry like in the first embodiment as above) and the content ($\alpha$ (mol %)) of $\alpha$-olefin units having at least 5 carbon atoms in the composition, and also the formula (4-II) that indicates the relationship between the crystallization temperature (Tc (° C.)) and the melting point (Tm (° C.)) of the composition both measured through differential scanning calorimetry, for the same reasons as those for the first embodiment mentioned above. The preferred ranges of those formulae may be the same as those mentioned hereinabove for the first embodiment, and their detailed description is not repeated herein.

For the propylene-based random copolymer of the component (4-A) in the composition of this embodiment, it is desirable that the content of $\alpha$-olefin units having at least 5 carbon atoms in the copolymer and also the isotactic fraction (P) and the intrinsic viscosity [$\eta$] of the copolymer all fall within the preferred ranges mentioned hereinabove for the first embodiment, for the same reasons as those for the first embodiment. The detailed description of the preferred ranges of those parameters of the copolymer is omitted herein.

The fifth aspect of the invention is described in detail hereinunder.

The first embodiment of the fifth aspect of the invention is a propylene-based random copolymer of propylene and 1-butene, which satisfies the following formula (5-I):

$$Tm \leq 160 - 3\alpha \qquad (5\text{-}I)$$

wherein Tm (° C.) indicates the melting point of the copolymer measured through differential scanning calorimetry, and $\alpha$ (mol %) indicates the 1-butene unit content of the copolymer.

If its Tm is above the value of "160–3$\alpha$", the copolymer could not have well-balanced low-temperature heat-sealability and toughness. In view of the balance of the physical properties of the copolymer, it is desirable that Tm satisfies the following:

$$Tm \leq 155 - 3\alpha.$$

The copolymer also satisfies the following formula (5-II):

$$Tc \geq 2\ 0.75Tm - 10 \qquad (5\text{-}II)$$

wherein Tc (° C.) and Tm (° C.) each indicate the crystallization temperature and the melting point, respectively, of the copolymer both measured through differential scanning calorimetry.

If Tc is smaller than "0.75Tm–10", molding the copolymer will often end in failure. In order to prevent it from giving failed moldings, it is desirable that the copolymer satisfies the following:

$$Tc \geq 0.75Tm - 5,$$

more preferably, $$Tc \geq 0.75Tm.$$

It is desirable that the 1-butene content of the propylene-based random copolymer of the invention falls between 0.1 and 30 mol %, more preferably between 0.2 and 29 mol %, even more preferably between 0.3 and 28 mol %. If the content is smaller than 0.1 mol %, the low-temperature heat-sealability of the copolymer could not be improved to a satisfactory degree; but if larger than 30 mol %, the crystallinity and therefore the toughness of the copolymer will be low.

It is also desirable that the isotactic fraction (P) and the intrinsic viscosity [$\eta$] of the propylene-based random copolymer of this embodiment of the invention all fall within the preferred ranges mentioned hereinabove for the first embodiment of the fourth aspect of the invention, for the same reasons as those for that embodiment. The detailed description of the preferred ranges of those parameters of the copolymer is omitted herein.

To produce the propylene-based random copolymer of the invention, various types of metallocene catalysts can be used. Preferably used are metallocene catalysts comprising a combination of a metallocene transition metal compound with an organoaluminium compound or an ionizing agent (e.g., boron compound), etc. The metallocene catalysts and the polymerization conditions for the copolymer may be the same as those mentioned hereinabove for the third aspect of the invention, and their detailed description is omitted herein.

The second embodiment of the fifth aspect of the invention is a propylene-based random copolymer composition comprising (5-A) a propylene-based random copolymer of propylene and 1-butene, and (5-B) a substance having the capability of nucleation.

The nucleating agent of the component (5-B) to be in the composition of this embodiment may be any one capable of readily inducing crystalline nuclei in the propylene-based polymer thereby to lower the degree of supercooling necessary for the start of polymer crystallization, without detracting from the physical properties of the polymer, like that in the first embodiment of the first aspect of the invention. Its specific examples and its amount to be added to the polymer may be the same as those mentioned hereinabove, and their detailed description is omitted herein.

The propylene-based random copolymer composition of this embodiment, which comprises the component (5-A) and the component (5-B), must satisfy the formula (5-I) that indicates the relationship between the melting point (Tm (° C.)) of the composition (this is measured through differential scanning calorimetry like in the first embodiment as above) and the 1-butene unit content ($\alpha$ (mol %)) thereof, and also the formula (4-II) that indicates the relationship between the crystallization temperature (Tc (° C.)) and the melting point (Tm (° C.)) of the composition both measured through differential scanning calorimetry, for the same reasons as those for the first embodiment mentioned above. The preferred ranges of those formulae may be the same as those mentioned hereinabove for the first embodiment, and their detailed description is not repeated herein.

It is desirable that the 1-butene content, the isotactic fraction (P) and the intrinsic viscosity [$\eta$] of the propylene-based random copolymer composition of this embodiment all fall within the preferred ranges mentioned hereinabove for the first embodiment, for the same reasons as those for the first embodiment. The detailed description of the preferred ranges of those parameters of the composition is omitted herein.

The sixth aspect of the invention is described in detail hereinunder.

The polymer composition of the sixth aspect of the invention is a propylene-based polymer composition comprising (6-A) a propylene-based random copolymer obtained through polymerization of propylene and an $\alpha$-olefin having at least 4 carbon atoms in the presence of a metallocene catalyst, and having a propylene-derived structural unit content of from 80 to 99.9 mol %, an α-olefin-derived structural unit content of from 0.1 to 20 mol %, and an intrinsic viscosity [η] of from 0.5 to 5.0 dl/g, and (B) at least 10 ppm of a nucleating agent.

Regarding the structural units constituting the propylene-based random copolymer of the component (6-A), the copolymer must have units from an α-olefin having at least 4 carbon atoms. Preferably, the copolymer has units from an α-olefin having at least 5 carbon atoms, more preferably those from an α-olefin having at least 6 carbon atoms, for ensuring better heat-sealability. Of the copolymer, the propylene-derived structural unit content falls between 80 and 99.9 mol %, and the α-olefin-derived structural unit content falls between 0.1 and 20 mol %. Preferably, however, the α-olefin-derived structural unit content of the copolymer falls between 0.2 and 15 mol %, more preferably between 0.3 and 10 mol %.

The propylene-based random copolymer of the component (6-A) has an intrinsic viscosity [η] of from 0.5 to 5.0 dl/g, as measured in decalin at 135° C. If the intrinsic viscosity [η] of the copolymer oversteps the defined range, forming the composition into films will often end in failure. Preferably, the intrinsic viscosity [η] of the copolymer falls between 1.0 and 3.0 dl/g.

The α-olefin having at least 4 carbon atoms for the propylene-based random copolymer of the component (6-A) includes 1-butene, 1-pentene, 3-methyl-1-butene, 4-methyl-1-pentene, 1-hexene, 1-octene, 1-decene, 1-dodecene, 1-tetradecene, 1-hexadecene, 1-octadecene, 1-eicosene, etc.

To produce the propylene-based random copolymer of the component (6-A), various types of metallocene catalysts can be used. Preferably used are metallocene catalysts comprising a combination of a metallocene transition metal compound with an organoaluminium compound or an ionizing agent (e.g., boron compound), etc. The metallocene catalysts and the polymerization conditions for the copolymer may be the same as those mentioned hereinabove for the third aspect of the invention, and their detailed description is omitted herein.

The nucleating agent of the component (B) for use herein may be any one capable of readily inducing crystalline nuclei in the propylene-based polymer thereby to lower the degree of supercooling necessary for the start of polymer crystallization, without detracting from the physical properties of the polymer, like that in the first embodiment of the first aspect of the invention. Its specific examples and its amount to be added to the polymer may be the same as those mentioned hereinabove, and their detailed description is omitted herein.

For the propylene-based polymer composition in which the α-olefin for the copolymer is 1-butene, it is desirable that the tensile modulus (TM (MPa)) in the MD direction and the heat-sealing temperature (HST (° C.)) of the composition satisfy the following formula (6-I):

$$TM \geq 22 \times HST - 1850 \quad (6\text{-}I),$$

more preferably, $$TM \geq 22 \times HST - 1800,$$

even more preferably, $$TM \geq 22 \times HST - 1750.$$

For the composition in which the α-olefin for the copolymer has at least 5 carbon atoms, it is desirable that TM (MPa) and HST (° C.) of the composition satisfy the following formula (6-II):

$$TM \geq 22 \times HST - 1700 \quad (6\text{-}II),$$

more preferably, $$TM \geq 22 \times HST - 1650,$$

even more preferably, $$TM \geq 22 \times HST - 1600.$$

Of the propylene-based polymer composition of the invention, the boiling ether-soluble content (E (% by weight)) and the 1-butene content (α (mol %)) preferably satisfy the following formula (6-III):

$$E \leq 0.2 \times \alpha + 1.0 \quad (6\text{-}III),$$

more preferably, $$E \leq 0.2 \times \alpha + 0.5.$$

If E is larger than 0.2×α+1.0, films of the composition will be sticky and their tensile modulus will be low.

The propylene-based random copolymer, the propylene-based random copolymer composition, and their films, laminates, fibers, sheets and moldings of the invention may optionally contain various additives, such as, for example, nucleating agents, heat stabilizers, antioxidants, water-proofing agents, neutralizing agents, slip agents, anti-blocking agents, lubricants, dyes, pigments, fillers, anti-frosting agents, antistatic agents, etc.

The antioxidants include phosphorus-containing antioxidants and phenolic antioxidants, such as pentaerythrityl tetrakis[3-(3,5-di-tert-butyl-4-hydroxyphenyl)propionate] (trade name: Irganox 1010), tris(2,4-di-tert-butylphenyl) phosphite (trade name: Irganox 168), octadecyl 3-(3,5-5-di-tert-butyl-4-hydroxyphenyl)propionate (trade name: Irganox 1076), 1,3,5-trimethyl-2,4,6-tris (3,5-di-tert-butyl-4-hydroxybenzyl)benzene (trade name: Irganox 1330), tris(3,5-di-tert-butyl-4-hydroxybenzyl)isocyanurate (trade name: Irganox 3114), tetrakis(2,4-di-tert-butylphenyl) 4,4'-biphenylene-diphosphite (trade name: P-EPQ), etc. The amount of the antioxidant is preferably from 1 to 10000 ppm of the propylene-based resin or the propylene-based resin composition to which it is added.

The neutralizing agents include metal salts of aliphatic compounds such as calcium stearate, zinc stearate, magnesium stearate, etc.; and hydrotalcite and its related compounds such as hydrotalcite having a compositional formula of $Mg_{4.5}Al_2(OH)_{13}CO_3.3.5H_2O$ (trade name: DHT-4A) . The amount of the neutralizing agent is preferably from 1 to 10000 ppm of the propylene-based resin or the propylene-based resin composition to which it is added.

The anti-blocking agents include synthetic silica products, such as Fuji Silicia's synthetic silica (trade name: Saisilia), Mizusawa Chemical Industry's synthetic silica (trade name: Mizucasil), etc. The amount of the anti-blocking agent is preferably from 1 to 10000 ppm of the propylene-based resin or the propylene-based resin composition to which it is added.

The slip agents include fatty acid amides such as erucamide, oleamide, stearamide, behenamide, ethylenebisstearamide, ethylenebisoleamide, stearylercamide, oleylpalmitamide, etc. The amount of the slip agent is preferably from 1 to 10000 ppm of the propylene-based resin or the propylene-based resin composition to which it is added.

The propylene-based random copolymer or the propylene-based random copolymer composition of the invention can be formed into films through melt extrusion.

For example, the resin, the nucleating agent and other various components that are to constitute the composition of the invention are blended in dry, optionally along with various additives, for example, in a Henschel mixer, a V blender, a ribbon blender, a tumbler blender or the like; then the resulting blend is kneaded and pelletized by the use of a kneading machine, for example, through a single-screw extruder, a multi-screw extruder, a kneader, a Banbury mixer or the like; and the resulting pellets are formed into films through melt extrusion, for example, for film casting, blown-film extrusion or the like.

As the case may be, the resin, the nucleating agent and other various components that are to constitute the composition of the invention are blended in dry, optionally along with various additives, in a Henschel mixer or the like, and the resulting blend is cast into films.

To form the films, preferably employed is a T-die casting method for which is used a large-scale film-forming machine. This is because the method enables high-speed film formation and gives good films having high toughness, good heat-sealability and high transparency. However, the invention is not limited to the method. So far as films can be formed through melt extrusion, herein employable is any method of injection molding, blow molding, extrusion molding, but preferably casting or blown-film extrusion.

For example, in the T-die casting method, films having a thickness of from 10 to 500 μm are well formed even in a high-speed film-forming condition at a take-up speed of 50 m/min or higher. Since the resin and the resin composition of the invention have good properties such as those mentioned above, they are favorable to at least one layer of laminate films to be formed through co-extrusion. The films can be well stretched and oriented, and are favorable to stretched or oriented films. In addition, the invention is favorable to fibers, sheets, moldings and even to lamination for non-woven fabrics.

The invention is described more concretely with reference to the following Examples, which, however, are not intended to restrict the scope of the invention.

Methods of testing and evaluating propylene-based polymers, and methods of testing and evaluating films are described below.

1. Resin Characteristics (1) Measurement of intrinsic viscosity [η]:

Using an automatic viscometer, Rigo's Model VMR-053, a resin sample was measured in a solvent of decalin at 135° C.

(2) Measurement of Mw/Mn:

In Examples 1 to 9 and Comparative Examples 1 to 6, Mw/Mn was determined by the use of the apparatus mentioned below and under the condition also mentioned below.

Apparatus No. 1 for GPC:
  Column: Showa Denko's Shodex UT806L.
  IR detector: for liquid chromatography.
  Flow cell for IR detection: KBr cell (optical guide length: 1 mm).
Condition No. 1 for measurement:
  Solvent: o-dichlorobenzene.
  Temperature: 135° C.
  Flow rate: 1.0 ml/min.
  Sample concentration: 2 mg/ml.
  Sample amount: 200 μl.
  IR absorption wavelength: 3.42 μm.

In Examples 26 to 29 and Comparative Examples 20 to 19, Mw/Mn was determined by the use of the apparatus mentioned below and under the condition also mentioned below.

Apparatus for GPC:
  Column: TOSO GMHHR-H(S)HT.
  Detector: RI detector for liquid chromatography, WATERS 150 C.
Condition for measurement:
  Solvent: 1,2,4-trichlorobenzene.
  Temperature: 145° C.
  Flow rate: 1.0 ml/min.
  Sample concentration: 2.2 mg/ml.
  Sample amount: 160 μl.
  Calibration curve: Universal Calibration.
  Program for analysis: HT-GPC (Ver. 1.0).

(3) Measurement of melting point (Tm) and crystallization temperature (Tc):

A differential scanning calorimeter (Parkin Elmer's DSC-7) was used. 10 mg of a sample was first melted in a nitrogen atmosphere at 230° C. for 3 minutes, and then cooled to 0° C. at a cooling rate of 10° C./min. In the exothermic curve indicating the crystallization profile of the sample, thus obtained, the temperature for the peak top of the highest peak was read. This is the crystallization temperature of the sample. Next, the cooled sample was kept at 0° C. for 3 minutes, and then again heated at a heating rate of 10° C./min. In the endothermic curve indicating the melting profile of the sample, thus obtained, the temperature for the peak top of the highest peak was read. This is the melting point of the sample.

(4) Isotactic pentad fraction:

The isotactic pentad fraction (mmmm fraction) indicates the proportion (mol %) of five propylene structural units having a meso structure (mmmm structure with all five methyl groups therein being aligned in the same direction) in a propylene-based polymer, and this is determined on the basis of the assignment of the peaks appearing in the $^{13}$C-NMR spectrum of the polymer, as proposed by Cheng, H. N. and Ewen, J. A., in Macromol. Chem., 190, 1350 (1989). To determine this, the following apparatus was used under the condition mentioned below.

Apparatus: JEOL's NMR apparatus of JNM-EX400 Model.
Sample concentration: 220 mg/3 ml NMR solvent.
NMR solvent: 1,2,4-trichlorobenzene/heavy benzene (90/10 vol. %).
Temperature: 130° C.
Pulse width: 45°.
Pulse pitch: 10 sec.
Number of cycles: 4000.

(5) Measurement of boiling diethyl ether-soluble content (E):

3 g of pellets of a sample of propylene-based random copolymers and others to be measured (the pellets were ground into grains capable of passing through a 1 mmφ mesh) were put into a cylindrical paper filter. 160 ml of an extraction solvent, diethyl ether was put into a flat bottom flask. These were set in a Soxhlet extractor, and the sample was extracted at a frequency of refluxing of once/5 minutes or so. The resulting diethyl ether extract was recovered with an evaporator, and then dried in a vacuum drier until it came to have a constant weight. From the weight of the thus-dried extract, the boiling diethyl ether-soluble content of the sample was obtained.

(6) Peak temperature for essential elution (Tp), half-value width (Th) for peak temperature for essential elution, amount of elution at 0° C. (W0), and amount of elution (WP) within temperature range between (Tp−5)° C. and (Tp+5)° C., in temperature-programmed fractionation chromatography (TREF):

These were obtained from the elution pattern in temperature-programmed fractionation chromatography (TREF) of each sample. The apparatus, the operation method and the condition for measurement are mentioned below.

Tp: This is the top temperature for the essential elution peak in the elution pattern curve.

W0: This is the weight fraction (%) of the component having been eluted but not adsorbed by the filler at the column temperature of 0° C., based on the total weight of the sample.

Wp: This is the weight fraction (%) of the component having been eluted within a temperature range between (Tp−5)° C. and (Tp+5)° C., based on the total weight of the sample.

W(Tp+10): This is the weight fraction (%) of the component having been eluted within a temperature range of (Tp+10)° C. or higher, based on the total weight of the sample.

(6-1) Operation method:

A sample solution was introduced into the TREF column controlled at 135° C., then gradually cooled therein to 0° C. at a cooling rate of 5° C./hr, whereby the sample was adsorbed by the filler. Next, the column was heated up to 135° C. at a heating rate of 40° C./hr, and the elution pattern curve of the sample was obtained.

(6-2) Apparatus:

TREF column: from GL Science.

Silica gel column (4.6φ×150 mm) flowcell: from GL Science (optical guide length 1 mm, with KBr cell).

Feed pump: Senshu Science's pump, SSC-3100.

Valve oven: GL science's oven, Model 554.

TREF oven: from GL science.

Two-line temperature controller: Rigaku Kogyo's temperature controller, REX-C100.

Detector: Foxboro's IR detector for liquid chromatography, MIRAN 1A CVF.

10-way valve: Balco's electromotive valve.

Loop: Balco's 500 μl loop.

(6-3) Condition for measurement:

Solvent: o-dichlorobenzene.

Sample concentration: 7.5 g/liter.

Sample amount: 500 μl.

Pump flow rate: 2.0 ml/min.

Wavelength for detection: 3.41 μm.

Column filler: Chromosorb P (30 to 60 mesh).

Column temperature distribution: within ±0.2° C.

(7) Comonomer unit content (α (mol %)) and stereospecificity index (P (mol %)) of copolymer:

Using a JEOL's NMR apparatus, JNM-EX400 Model, each sample was subjected to $^{13}$C-NMR spectrometry under the condition mentioned below. From the spectral pattern obtained, the content of each comonomer unit in the sample was determined according to the methods mentioned below.

Sample concentration: 220 mg/3 ml NMR solvent.

NMR solvent: 1,2,4-trichlorobenzene/benzene-d6 (90/10 vol. %).

Temperature: 130° C.

Pulse width: 45°.

Pulse pitch: 4 sec.

Number of cycles: 4000.

The $^{13}$C-NMR data were analyzed according to the reports by Kazuo Soga, Takeshi Shiono and Walter Kaminsky in Macromol. Chem., Rapid Commun., 8, 305 (1987), and by Alfonso Grassi, Adolfo Zambelli, Luigi Resconi, Enrico Albizzati and Romano Mazzocchi in Macromolecules, 21, 617 (1988), etc.

(7-1) Ethylene unit:

The chemical shift for each spectral signal appearing in $^{13}$C-NMR patterns of propylene-ethylene random copolymers, and its assignment are given in Table 1.

The ethylene unit content (α (mol %)) of a copolymer sample was obtained according to the following formula, based on the data of the $^{13}$C-NMR spectral pattern of the sample.

$$\alpha = E/S \times 100$$

wherein S and E are as follows:

$$S = I_{EPE} + I_{PPE} + I_{EEE} + I_{PPP} + I_{PEE} + I_{PEP}$$

$$E = I_{EEE} + 2/3(I_{PEE} + I_{EPE}) + 1/3(I_{PPE} + I_{PEP}),$$

and the factors for S and E are as follows:

$$I_{EPE} = I(12)$$

$$I_{PPE} = I(15) + I(11) + (I(14) - I(11))/2 + I(10)$$

$$I_{EEE} = I(18)/2 + I(17)/4$$

$$I_{PPP} = I(19) + (I(6) + I(7))/2 + I(3) + I(13) + I(11) + (I(14) - I(11))/2$$

$$I_{PEE} = I(20)$$

$$I_{PEP} = (I(8) + I(9) - 2 \times I(11))/4 + I(21).$$

The isotactic triad fraction of the PPP chains, indicating the stereospecificity index (P (mol %)) of the copolymer, was obtained according to the following formula:

$$P = Im/I \times 100$$

wherein Im and I are as follows:

$$Im = I(22)$$

$$I = I(22) + I(23) + I(24) - \{(I(8) + I(9))/2 + I(10) + 3/2 \times I(11) + I(12) + I(13) + I(15)\}.$$

In these, (1), (2) . . . each indicate the spectral signal appearing in the $^{13}$C-NMR patterns of propylene-ethylene random copolymers. I(1), I(2) . . . each indicate the signal intensity.

(7-2) 1-Butene unit:

The chemical shift for each spectral signal appearing in $^{13}$C-NMR patterns of propylene-1-butene random copolymers, and its assignment are given in Table 2.

The 1-butene unit content (α (mol %)) of a copolymer sample was obtained according to the following formula, based on the data of the main chain methylene carbon in the $^{13}$C-NMR spectral pattern of the sample.

$$\text{1-Butene content} = [(I<2>/2 + I<4>) \times 100]/(I<1> + I<2> + I<3> + I<4> + 2 \times I<9>).$$

In this, the signal intensity for <9> (signal intensity for the PPP chain Sαβ carbon) was used in substitution for the signal intensity for the PPP chain Sαβ carbon.

The stereospecificity index (P (mol %)) of the copolymer was obtained according to the following formula:

$$P = [I<12> \times 100]/(I<12> \times I<13> \times I<14>).$$

In these, <1>, <2> . . . each indicate the spectral signal appearing in the $^{13}$C-NMR patterns of propylene-1-butene random copolymers. I<1>, I<2> . . . each indicate the signal intensity.

(7-3) 1-Octene unit:

The chemical shift for each spectral signal appearing in $^{13}$C-NMR patterns of propylene-1-octene random copolymers, and its assignment are given in Table 3.

The 1-octene unit content (α (mol %)) of a copolymer sample was obtained according to the following formula, based on the data of the main chain methylene carbon in the $^{13}$C-NMR spectral pattern of the sample.

1-Octene content=[(I<2>/2+I<4>)×100]/(I<1>×I<2>×I<3>×I>4>+2×I<11>).

In this, the signal intensity for the PPP chain Sαβ carbon was used in substitution for the signal intensity for the PPP chain Sαβ carbon. This is because the signal for the PPP chain Sαβ carbon overlapped with that for the PPP chain Tαβ carbon and the two were difficult to separate from each other.

The stereospecificity index (P (mol %)) of the copolymer was obtained according to the following formula:

P=[I<16>×100]/(I<16>×I<17>×I<18>).

In these, <1>, <2> . . . each indicate the spectral signal appearing in the $^{13}$C-NMR patterns of propylene-1-octene random copolymers. I<1>, I<2> . . . each indicate the signal intensity.

(7-4) 1-Dodecene unit:

The chemical shift for each spectral signal appearing in $^{13}$C-NMR patterns of propylene-1-dodecene random copolymers, and its assignment are given in Table 4.

The 1-dodecene unit content (α (mol %)) of a copolymer sample was obtained according to the following formula, based on the data of the main chain methylene carbon in the $^{13}$C-NMR spectral pattern of the sample.

1-Dodecene content=[(I<2>/2+I<4>)×100]/(I<1>×I<2>×I<3>×I<4>).

In this, the signal intensity for the PPP chain Sαα carbon was used in substitution for the signal intensity for the PPP chain Sαβ carbon and for the signal intensity for the PPP chain Sαβ carbon. This is because the signal for the PPP chain Sαβ carbon overlapped with that for the PPP chain Tαβ carbon while the signal for the PPP chain Sαβ carbon overlapped with the signal for the side chain methylene carbon of the 1-dodecene unit, and they were difficult to separate from each other.

The stereospecificity index (P (mol %)) of the copolymer was obtained according to the following formula:

P=[I<5>×100]/(I<6>×I<7>×I<8>).

In these, <1>, <2> . . . each indicate the spectral signal appearing in the $^{13}$C-NMR patterns of propylene-1-dodecene random copolymers. I<1>, I<2> . . . each indicate the signal intensity.

(7-5) 1-Decene unit:

The 1-decene unit content (mol%) and the stereospecificity index (P (mol%)) of each copolymer sample were obtained in the same manner as in (7-4), except that the data given in Table 5 (this shows the spectral signal profile of propylene-1-decene random copolymers obtained through $^{13}$C-NMR) were used in place of the data in Table 4.

In this, the signal for the PPP chain Sαβ carbon overlapped with that for the PPP chain Tαβ carbon while the signal for the PPP chain Sαβ carbon overlapped with the signal for the side chain methylene carbon of the 1-decene unit, and they were difficult to separate from each other.

Therefore, the signal intensity for the PPP chain Sαα carbon was used in substitution for the signal intensity for these two.

TABLE 1

Assignment in NMR Spectrum of Ethylene/Propylene Copolymer

| No. | Chemical Shift | Assignment |
|---|---|---|
| 1 | 45.1–47.3 | PPP Sαα |
| 2 | 42.3 | PPP Sαα |
| 3 | 38.6 | PPP Tαγ |
| 4 | 38.0 | Sαγ |
| 5 | 37.5 | Sαδ |
| 6 | 36.0 | PPP Sαβ |
| 7 | 36.0 | PPP Tαβ |
| 8 | 34.9 | EPP, PEP Sαβ |
| 9 | 34.6 | EPP, PEP Sαβ |
| 10 | 34.1 | EPP Tγγ |
| 11 | 33.7 | EEPP Tγβ |
| 12 | 33.3 | EPE Tδδ |
| 13 | 31.6 | PPP Tβγ |
| 14 | 31.4 | EPP Tβγ |
| 15 | 31.0 | PPE Tβδ |
| 16 | 30.7 | PPP Sαβ |
| 17 | 30.5 | PEEE Sγβ |
| 18 | 30.0 | EEE Sδδ |
| 19 | 29.0 | PPP Tββ |
| 20 | 27.3 | PEE Sβδ |
| 21 | 24.6 | PEP Sαβ |
| 22 | 21.3–22.7 | Pββ |
| 23 | 20.6–21.3 | Pββ |
| 24 | 19.8–20.6 | Pββ |
| 25 | 17.6 | Pαβ |
| 26 | 17.2 | Pαγ |

Note:
E indicates an ethylene unit; P indicates a propylene unit; the underlined part indicates a reversed unit. The chemical shift is in terms of PPM.

TABLE 2

Assignment in NMR Spectrum of 1-Butene/Propylene Copolymer

| No. | Chemical Shift | Assignment |
|---|---|---|
| 1 | 45.7–47.4 | PP Sαα |
| 2 | 43.0–44.9 | PB Sαα |
| 3 | 42.3 | PPP Sαα |
| 4 | 40.3 | BB Sαα |
| 5 | 38.6 | PPP Tαγ |
| 6 | 36.0 | PPP Sαβ and PPP Tαβ |
| 7 | 35.5 | B unit Tββ |
| 8 | 31.6 | PPP Tβγ |
| 9 | 30.6 | PPP Sαβ |
| 10 | 28.6–29.8 | P unit Tββ |
| 11 | 27.8–28.4 | B unit Tββ |
| 12 | 21.2–22.7 | B unit side chain methylene carbon |
| 13 | 20.6–21.2 | Pββ PPP(mm), PPB(mm), BPB(mm), PPB(rr), BPB(rr) |
| 14 | 19.8–20.6 | Pββ PPP(rr) |
| 15 | 17.6 | Pαβ |
| 16 | 17.2 | Pαγ |
| 17 | 11.1 | B unit side chain methyl carbon |

Note:
B indicates 1-butene unit; P indicates a propylene unit; the underlined part indicates a reversed unit. The chemical shift is in terms of PPM.

TABLE 3

Assignment in NMR Spectrum of 1-Octene/Propylene Copolymer

| No. | Chemical Shift | Assignment |
|---|---|---|
| 1 | 46.0–47.6 | PP Sαα |
| 2 | 43.8–44.4 | PO Sαα |

TABLE 3-continued

Assignment in NMR Spectrum of 1-Octene/Propylene Copolymer

| No. | Chemical Shift | Assignment |
|---|---|---|
| 3 | 42.3 | PP<u>P</u> Sαα |
| 4 | 41.5 | OO Sαα |
| 5 | 38.6 | PPP TαT |
| 6 | 36.2 | $C_6$ |
| 7 | 36.0 | <u>P</u>PP Sαβ and PP<u>P</u> Tαβ |
| 8 | 34.0 | O unit Tββ |
| 9 | 32.2 | $C_3$ |
| 10 | 31.6 | PP<u>P</u> Tβγ |
| 11 | 30.6 | <u>P</u>PP Sαβ |
| 12 | 30.2 | $C_4$ |
| 13 | 28.2–29.8 | P unit Tββ |
| 14 | 27.1 | $C_5$ |
| 15 | 22.9 | $C_2$ |
| 16 | 21.2–22.7 | Pββ |
| 17 | 20.6–21.2 | Pββ |
| 19 | 19.8–20.6 | Pββ |
| 19 | 17.6 | Pαβ |
| 20 | 17.2 | Pαγ |
| 21 | 14.1 | Oββ |

Note:
P indicates a propylene unit; O indicates a 1-octene unit; the underlined part indicates a reversed unit. The chemical shift is in terms of PPM.

The P<u>P</u>P chain (2-1 insertion in the propylene unit) is referred to as one example, and the relationship between the ¯C-NMR spectral pattern and each carbon atom is shown in the following drawing. In this, the numerals each indicate the carbon atom that corresponds to the number of the spectrum given in Table 3. O indicates the methyl group.

Drawing, Page 48

P unit    <u>P</u> unit    P unit

In Table 3, $C_2$ to $C_6$ each indicate the following methylene in the side chain of the 1-octene unit.

Drawing Page 49

TABLE 4

Assignment in NMR Spectrum of 1-Dodecene/Propylene Copolymer

| No. | Chemical Shift | Assignment |
|---|---|---|
| 1 | 46.0–47.6 | PP Sαα |
| 2 | 43.8–44.4 | PD Sαα |
| 3 | 42.3 | PP<u>P</u> Sαα |
| 4 | 41.5 | DD Sαα |
| 5 | 21.1–22.7 | Pββ |
| 6 | 20.6–21.2 | Pββ |
| 7 | 19.8–20.6 | Pββ |

Note:
P indicates a propylene unit; D indicates a 1-dodecene unit; the underlined part indicates a reversed unit. The chemical shift is in terms of PPM.

TABLE 5

Assignment in NMR Spectrum of 1-Decene/Propylene Copolymer

| No. | Chemical Shift | Assignment |
|---|---|---|
| 1 | 46.0–47.6 | PP Sαα |
| 2 | 43.8–44.4 | PD Sαα |
| 3 | 42.3 | PP<u>P</u> Sαα |
| 4 | 41.5 | DD Sαα |
| 5 | 21.1–22.7 | Pββ |
| 6 | 20.6–21.2 | Pββ |
| 7 | 19.8–20.6 | Pββ |

Note:
P indicates a propylene unit; D indicates a 1-decene unit; the underlined part indicates a reversed unit. The chemical shift is in terms of PPM.

2. Film Formation

Using a Tsukada Juki Seisakusho's 20 mmφ T-die casting machine, each sample of propylene-based resins and others was formed into films having a thickness of 25 μm or 30 μm, under the condition mentioned below. To finish the films, an air knife was used, and the air gap was 5.5 cm.

[Film Casting Condition]

Resin temperature at T-die outlet:
  191° C. for 25 μm films,
  192° C. for 30 μm films.
Chill roll temperature: 30° C.
Take-up speed: 6.0 m/min.
Chill roll: with mirror surface.

3. Film Characteristics

The films formed according to the method mentioned above were aged at 40° C. for 24 hours, and then conditioned at a temperature of 23±2° C. at a humidity of 50±10% for at least 16 hours. The characteristics of the thus-conditioned films were measured at the same temperature and the same humidity.

(1) Measurement of Tensile Modulus (TM)

Each film was subjected to a tensile test according to JIS K-7127 under the condition mentioned below, and its tensile modulus was measured.
  Cross head speed: 500 mm/min.
  Load cell: 10 kg.
  Direction: Machine direction (MD)

(2) Film Impact (FI)

The film impact indicates the film strength at fracture by shock. This was measured with a Toyo Seiki's film impact tester, for which was used a one-inch impact head.

(3) Measurement of Heat-sealing Temperature (HST)

The heat-sealing temperature (HST) of films was measured according to JIS Z-1707. Precisely, films were heat-sealed at varying temperatures under the condition mentioned below, then left at room temperature for one full day, and subjected to a 90-degree peel test at a peel rate of 200 mm/min to measure the peel strength of the films. The data were plotted to give a heat temperature-peel strength curve, from which the temperature at which the peel strength was 300 g/15 mm was derived. This is the heat-sealing temperature of the sample tested. The temperature of the heat seal bar used in the test was calibrated with a surface thermometer.
  Sealing time: 1 sec.
  Sealed area: 15 mm×10 mm.
  Sealing pressure: 2.0 kg/cm².
  Sealing temperature: varied to some points. The heat-sealing temperature was determined through interpolation.

(4) Evaluation of Anti-blocking Properties

Rectangular films (30 cm×10 cm) were fixed to a tool having a blocking test area of 10 cm×10 cm, and airtightly adhered to each other under the conditions mentioned below.

Then, these were peeled to measure the peel strength, which indicates the anti-blocking properties of the sample tested.

Condition 1 for adhesion:
Temperature: 60° C.
Time: 3 hours.
Load: 36 g/cm$^2$.
Area: 10 cm×10 cm.
Condition 2 for adhesion:
Temperature: 50° C.
Time: 1 week.
Load: 15 g/cm$^2$.
Area: 10 cm×10 cm.

The condition for the peel test was as follows:
Test speed (peel rate): 20 mm/min.
Load cell: 2 kg (5) Evaluation of Slip Characteristics A slat covered with a film to be tested was put on a glass plate also covered with a film of the same type. In that condition, the glass plate was inclined, and the angle, θ, at which the slat on the glass plate began to slip was measured. The value of tan θ indicates the slip characteristics of the sample. A Toyo Seiki Seisakusho's friction angle meter was used in the test under the condition mentioned below.

Interface for measurement: metal roll surface/metal roll surface.
Inclination rate: 2.7 degrees/sec.
Weight of slat: 1 kg.
Cross section area of slat: 65 cm$^2$.
Pressure to interface: 15 g/cm$^2$.

(6) Measurement of Transparency (in Terms of Haze)
JIS K7105 was referred to.

The following Examples 1 to 9 and Comparative Examples 1 to 6 relate to the first aspect of the invention.

EXAMPLE 1

(1) Propylene Polymerization 4 liters of toluene, 8 mmols of triisobutylaluminium, and 20 μmols of dimethylanilinium tetrakispentafluorophenyl borate were put into a 10-liter stainless autoclave, and heated at 40° C., to which was added 10 mmols of hydrogen. Propylene was introduced into the autoclave until the total pressure in the autoclave reached 7.0 kg/cm$^2$G. In that condition, 5 μmols of (1,2'-ethylene)(2,1'-ethylene)-bis(indenyl)hafnium dichloride was added to this, and the monomer was polymerized. During the process, propylene was fed into the system via a pressure controller so that the pressure in the autoclave could be kept constant. After 2 hours, the contents were taken out and dried under reduced pressure to obtain 820 g of a propylene polymer. The propylene polymer had an isotactic pentad fraction (mmmm fraction) of 88 mol %, [η] of 1.5 dl/g, and Mw/Mn of 1.9.

(2) Blending and Kneading

To the propylene polymer prepared in the above, added were 750 ppm of Irganox 1010 (from Ciba Specialty Chemicals), 750 ppm of Irganox 168 (from Ciba Specialty Chemicals) both serving as an antioxidant, 500 ppm of potassium stearate serving as a neutralizing agent, 100 ppm of dimethylbenzylidene-sorbitol (Shin-Nippon Rika's Gelol MD) serving as a nucleating agent, 1000 ppm of erucamide serving as a slip agent, and 1800 ppm of a silica compound serving as an anti-blocking agent. The resulting mixture was kneaded in melt in a single-screw extruder (Tsukada Juki Seisakusho's TLC35-20 Model), and pelletized therethrough.

EXAMPLE 2

The same process as in Example 1 was repeated, except that the amount of the nucleating agent, Shin-Nippon Rika's Gelol MD was changed to 500 ppm.

Comparative Example 1

The same process as in Example 1 was repeated, except that the nucleating agent was not added.

Comparative Example 2

The same process as in Example 1 was repeated. In this, however, a propylene polymer prepared in the presence of a non-metallocene catalyst (Idemitsu Petrochemical's IDEMITSU PP F704NP) was used, and the nucleating agent was not added. The resin pellets produced were formed into films, and the films were evaluated. The propylene polymer used herein had an isotactic pentad fraction (mmmm fraction) of 90 mol %, [η] of 1.7 dl/g, and Mw/Mn of 4.2.

Comparative Example 3

The same process as in Example 1 was repeated. In this, however, a propylene polymer prepared in the presence of a non-metallocene catalyst (Idemitsu Petrochemical's IDEMITSU PP F704NP) was used, and 500 ppm of the nucleating agent, Gelol MD (from Shin-Nippon Rika) was added. The resin pellets produced were formed into films, and the films were evaluated. The propylene polymer used herein had an isotactic pentad fraction (mmmm fraction) of 90 mol %, [η] of 1.7 dl/g, and Mw/Mn of 4.2.

With the nucleating agent added thereto, the propylene polymer prepared in the presence of a non-metallocene catalyst had an elevated heat-sealing temperature.

EXAMPLE 3

(1) Propylene Polymerization 4 liters of toluene, 8 mmols of triisobutylaluminium, and 20 μmols of dimethylanilinium tetrakispentafluorophenyl borate were put into a 10-liter stainless autoclave, and heated at 50° C., into which was introduced a mixed gas of ethylene/propylene (having a composition ratio, ethylene/propylene of 2/100) until the total pressure in the autoclave reached 7.0 kg/cm$^2$G. In that condition, 5 μmols of (1,2'-ethylene)(2,1'-ethylene)-bis(indenyl)hafnium dichloride was added to this, and the monomers were polymerized. During the process, propylene was fed into the system via a pressure controller so that the pressure in the autoclave could be kept constant. After 2 hours, the contents were taken out and dried under reduced pressure to obtain 700 g of a propylene polymer. The propylene polymer had an ethylene content of 1.8% by weight, [η] of 1.8 dl/g, and Mw/Mn of 2.2.

(2) Blending and Kneading

To the propylene polymer prepared in the above, added were 750 ppm of Irganox 1010 (from Ciba Specialty Chemicals), 750 ppm of Irganox 168 (from Ciba Specialty Chemicals) both serving as an antioxidant, 500 ppm of potassium stearate serving as a neutralizing agent, 500 ppm of Gelol MD (from Shin-Nippon Rika) serving as a nucleating agent, 500 ppm of erucamide serving as a slip agent, and 2300 ppm of a silica compound serving as an anti-blocking agent. The resulting mixture was kneaded in melt in a single-screw extruder (Tsukada Juki Seisakusho's TLC35-20 Model), and pelletized therethrough.

EXAMPLE 4

A propylene-based polymer composition was produced in the same manner as in Example 3, except that the composition ratio of the mixed gas, ethylene/propylene was changed to 1/100. The polymer had an ethylene content of 0.48% by weight, [η] of 1.9 dl/g, and Mw/Mn of 2.1.

EXAMPLE 5

A propylene-based polymer composition was produced in the same manner as in Example 3, except that the composition ratio of the mixed gas, ethylene/propylene was changed to 3/100. The polymer had an ethylene content of 2.5% by weight, [η] of 1.6 dl/g, and Mw/Mn of 2.2.

EXAMPLE 6

The same process as in Example 3 was repeated, except that 2000 ppm of Talc MMR (from Asada Milling) was used as the nucleating agent. The polymer was blended and kneaded with other components, and formed into films, and the films were evaluated.

EXAMPLE 7

The same process as in Example 3 was repeated, except that 250 ppm of a sodium salt of an organic phosphoric acid, NA-11 (from Asahi Denka) was used as the nucleating agent. The polymer was blended and kneaded with other components, and formed into films, and the films were evaluated.

EXAMPLE 8

The same process as in Example 3 was repeated, except that 1500 ppm of an aluminium salt of an organic phosphoric acid, NA-21 (from Asahi Denka) was used as the nucleating agent. The polymer was blended and kneaded with other components, and formed into films, and the films were evaluated.

EXAMPLE 9

The same process as in Example 3 was repeated, except that 1500 ppm of an amide compound, N Jester NU-100 (from Shin-Nippon Rika) was used as the nucleating agent. The polymer was blended and kneaded with other components, and formed into films, and the films were evaluated.

Comparative Example 4

The same process as in Example 3 was repeated, except that the nucleating agent was not added.

Comparative Example 5

The same process as in Example 3 was repeated. In this, however, a propylene polymer prepared in the manner mentioned below in the presence of a non-metallocene catalyst was used, and the amount of the nucleating agent was changed to 1000 ppm.

(Propylene Polymerization)

(1) Preparation of Solid Catalyst Component

A reactor (capacity: 500 liters) equipped with a stirrer was fully purged with nitrogen gas, and 97.7 kg of ethanol, 640 g of iodine and 6.4 kg of metal magnesium were put into it. With stirring, these were reacted under reflux until no hydrogen gas was given by the system. Thus was formed a solid reaction product. The reaction mixture containing the solid reaction product was dried under reduced pressure, and the intended magnesium compound (solid product) was obtained.

A reactor (capacity: 500 liters) equipped with a stirrer was fully purged with nitrogen gas, and 30 kg of the magnesium compound (not ground), 150 liters of pure heptane, 4.5 liters of silicon tetrachloride, and 5.4 liters of di-n-butyl phthalate were put into it. These were kept at 90° C. With stirring, 144 liters of titanium tetrachloride was added thereto, and reacted at 110° C. for 2 hours. The resulting solid component was separated, and washed with pure heptane at 80° C. Then, 228 liters of titanium tetrachloride was added thereto, and further reacted at 110° C. for 2 hours. This was fully washed with pure heptane to obtain a solid catalyst component.

(2) Polymerization

Prior to being used for polymerization, the solid catalyst component was pretreated in the manner mentioned below.

230 liters of pure heptane was put into a 500-liter reactor equipped with a stirrer, and 25 kg of the solid catalyst component was added thereto along with triethylaluminium in a ratio of 1.0 mol/mol of Ti of the solid catalyst component and with dicyclopentylmethyldimethoxysilane in a ratio of 1.8 mols/mol of the same. Next, propylene was introduced into the reactor to have a propylene partial pressure of 0.3 kg/cm²G, and reacted at 25° C. for 4 hours. After having been thus processed, the solid catalyst component was washed a few times with pure heptane, and carbon dioxide was applied thereto and stirred for 24 hours.

With the thus-pretreated solid catalyst component, propylene was polymerized in the manner mentioned below.

3 mmols/hr, in terms of Ti, of the pretreated solid catalyst component was fed into a polymerization reactor (capacity: 200 liters) equipped with a stirrer, with 4 mmols/kg-PP of triethylamine and 1 mmol/kg-PP of cyclohexylmethyldimethoxysilane being fed thereinto, and propylene was polymerized in the reactor at a temperature of 80° C. The total pressure in the reactor was 28 kg/cm²G. In this process, ethylene and hydrogen were fed into the reactor. The amount of ethylene was so controlled that the propylene polymer produced could have a predetermined ethylene content; and that of hydrogen was so controlled that the polymer could have a predetermined molecular weight. The propylene polymer thus produced had an ethylene structural unit content of 5.9 mol %, a molecular weight distribution (Mw/Mn) of 4.0, and [η] of 1.7 dl/g.

Comparative Example 6

The same process as in Example 3 was repeated. In this, however, the propylene polymer prepared in the presence of the non-metallocene catalyst in Comparative Example 5 was used, and the nucleating agent was not added.

TABLE 6

| | Amount of Nucleating Agent Added ppm | Tensile Modulus MPa | Film Impact Strength (1 inch) J/m | Heat-Sealing Temperature ° C. |
|---|---|---|---|---|
| Example 1 | 100 | $1.1 \times 10^3$ | $3.2 \times 10^4$ | 131 |
| Example 2 | 500 | $1.1 \times 10^3$ | $3.2 \times 10^4$ | 131 |
| Example 3 | 500 | $0.9 \times 10^3$ | $2.8 \times 10^4$ | 121 |
| Example 4 | 500 | $1.2 \times 10^3$ | $2.8 \times 10^4$ | 127 |
| Example 5 | 500 | $0.8 \times 10^3$ | $3.2 \times 10^4$ | 111 |
| Example 6 | 2000 | $1.1 \times 10^3$ | $2.8 \times 10^4$ | 124 |
| Example 7 | 250 | $1.0 \times 10^3$ | $2.8 \times 10^4$ | 124 |
| Example 8 | 1500 | $1.1 \times 10^3$ | $2.6 \times 10^4$ | 123 |
| Example 9 | 1500 | $1.1 \times 10^3$ | $2.7 \times 10^4$ | 124 |
| Comp. Ex. 1 | 0 | $1.1 \times 10^3$ | $2.9 \times 10^4$ | 135 |
| Comp. Ex. 2 | 0 | $1.2 \times 10^3$ | $2.9 \times 10^4$ | 146 |
| Comp. Ex. 3 | 500 | $1.2 \times 10^3$ | $3.0 \times 10^4$ | 148 |
| Comp. Ex. 4 | 0 | $0.8 \times 10^3$ | $2.9 \times 10^4$ | 131 |
| Comp. Ex. 5 | 1000 | $0.9 \times 10^3$ | $2.8 \times 10^4$ | 130 |
| Comp. Ex. 6 | 0 | $0.9 \times 10^3$ | $2.8 \times 10^4$ | 126 |

The following Example 10 and Comparative Example 7 relate to the second aspect of the invention.

EXAMPLE 10

(1) Production of Component A 4.0 liters of toluene, 8 mmols of triisobutylaluminium, and 20 μmols of dimethylanilinium tetrakispentafluorophenyl borate were put into a 10-liter stainless autoclave, and heated at 40° C., to which was added 10 mmols of hydrogen. Propylene was introduced into the autoclave until the total pressure in the autoclave reached 7.0 kg/cm$^2$G. In that condition, 5 μmols of (1,2'-ethylene)(2,1'-ethylene)-bis(indenyl)hafnium dichloride was added to this, and the monomer was polymerized. During the process, propylene was fed into the system via a pressure controller so that the pressure in the autoclave could be kept constant. After 2 hours, the contents were taken out and dried under reduced pressure to obtain 820 g of polypropylene.

The polypropylene obtained herein had a mesopentad fraction (mmmm) of 91 mol %, an intrinsic viscosity [η] of 1.5 dl/g, and a molecular weight distribution (Mw/Mn) of 1.9.

(2) Production of Component B 400 ml of toluene, 1 mmol of triisobutylaluminium, and 4 μmols of dimethylanilinium tetrakispentafluorophenyl borate were put into a 1-liter stainless autoclave, and heated at 55° C., to which was added 4 mmols of hydrogen. Propylene was introduced into the autoclave until the total pressure in the autoclave reached 7.0 kg/cm$^2$G. In that condition, 1 μmol of (1,2'-ethylene)(2,1'-ethylene)-bis(indenyl)hafnium dichloride was added to this, and the monomer was polymerized. During the process, propylene was fed into the system via a pressure controller so that the pressure in the autoclave could be kept constant. After 1 hour, the contents were taken out, put into a large amount of methanol, filtered, and dried to obtain 75 g of polypropylene.

The polypropylene obtained herein had a mesopentad fraction (mmmm) of 90 mol %, an intrinsic viscosity [η] of 0.5 dl/g, and a molecular weight distribution (Mw/Mn) of 2.0.

(3) Blending and Kneading

The components A and B were mixed, the former being 91% by weight and the latter being 9% by weight. To the polymer mixture, added were 750 wt.ppm of Irganox 1010 (trade name from Ciba Specialty Chemicals), 750 wt.ppm of Irganox 168 (trade name from Ciba Specialty Chemicals) both serving as an antioxidant, 500 wt.ppm of potassium stearate serving as a neutralizing agent, 1000 wt.ppm of erucamide serving as a slip agent, and 1800 wt.ppm of a silica compound serving as an anti-blocking agent. The resulting mixture was kneaded in melt in a single-screw extruder (Tsukada Juki Seisakusho's TLC35-20 Model) to obtain a resin composition.

(4) Film Formation

Using a Tsukada Juki Seisakusho's 20 mmφ T-die casting machine, the resin composition was cast through the T-die into films having a thickness of 25 μm. The casting condition was as in the section 2 "Film Formation" mentioned hereinabove, and the films produced were evaluated as in the section 3 "Film Characteristics" also mentioned hereinabove. The data obtained are given in Table 2.

Comparative Example 7

A resin composition was produced in the same manner as in Example 10. In this, however, only the component A was used but the component B was not. The films formed from the resin composition were evaluated, and the data obtained are in Table 2. While formed, the films were necked in.

TABLE 7

|  | Tensile Modulus MPa | Film Impact (1 inch) J/m | Heat-sealing Temperature ° C. | Moldability |
| --- | --- | --- | --- | --- |
| Example 10 | 1.1 × 10$^3$ | 2.9 × 10$^4$ | 130 | not necked in |
| Comp. Ex. 7 | 1.1 × 10$^3$ | 2.9 × 10$^4$ | 135 | not necked in |

The following Examples 11 to 16, Comparative Examples 8 to 12, and Reference Example relate to the third aspect of the invention.

EXAMPLE 11

<Production of Copolymer (3-A)>

5.0 liters of toluene, 6 mmols of triisobutylaluminium, 500 ml of 1-octene, 40 μmols of dimethylanilinium tetrakispentafluorophenyl borate, and 20 μmols of 2-ethyl-5,6-dibenzoindenylzirconium dichloride were put into a 10-liter stainless autoclave, and heated at 50° C., into which was introduced propylene gas until the total pressure in the autoclave reached 8.0 kg/cm$^2$G. In that condition, the monomers were polymerized. During the process, propylene was fed into the system via a pressure controller so that the pressure in the autoclave could be kept constant. After 3 hours, the contents were taken out and dried under reduced pressure to obtain a copolymer.

To the copolymer powder obtained in the manner as above, added were the following additives. Using a kneader, the resulting mixture was kneaded, extruded, and pelletized.

(1) Antioxidant:
Ciba Specialty Chemicals' Irganox 1010, 1,000 ppm,
Ciba Specialty Chemicals' Irgafos 168, 1,000 ppm.

(2) Neutralizing agent: Calcium stearate, 1,000 ppm.

(3) Anti-blocking agent: Silica compound, 1,800 ppm.

(4) Slip agent: Erucamide, 500 ppm.

The resin characteristics of the copolymer pellets thus obtained were evaluated, as in the section 1 "Resin Characteristics" mentioned hereinabove.

<Production of Propylene-based Polymer (3-B)>

(1) Preparation of Magnesium Compound

A reactor (capacity: 500 liters) equipped with a stirrer was fully purged with nitrogen gas, and 97.2 kg of ethanol, 640 g of iodine and 6.4 kg of metal magnesium were put into it. With stirring, these were reacted under reflux until no hydrogen gas was given by the system. Thus was formed a solid reaction product. The reaction mixture containing the solid reaction product was dried under reduced pressure, and the intended magnesium compound (solid product) was obtained.

(2) Preparation of Solid Catalyst Component

A reactor (capacity: 500 liters) equipped with a stirrer was fully purged with nitrogen gas, and 30 kg of the magnesium compound (not ground), 150 liters of pure heptane (n-heptane), 4.5 liters of silicon tetrachloride, and 5.4 liters of di-n-butyl phthalate were put into it. These were kept at 90° C. With stirring, 144 liters of titanium tetrachloride was added thereto, and reacted at 110° C. for 2 hours. The resulting solid component was separated, and washed with pure heptane at 80° C. Then, 288 liters of titanium tetrachloride was added thereto, and further reacted at 110° C. for 2 hours. This was fully washed with pure heptane at 80° C. to obtain a solid catalyst component.

(3) Pretreatment 230 liters of pure heptane (n-heptane) was put into a 500-liter reactor equipped with a stirrer, and 25 kg of the solid catalyst component was added thereto along with triethylaluminium in a ratio of 1.0 mol/mol of Ti of the solid catalyst component and with dicyclopentyldimethoxysilane in a ratio of 1.8 mols/mol of the same. Next, propylene was introduced into the reactor to have a propylene partial pressure of 0.3 kg/cm$^2$G, and reacted at 25° C. for 4 hours. After having been thus processed, the solid catalyst component was washed a few times with pure heptane, and carbon dioxide was applied thereto and stirred for 24 hours.

(4) Polymerization

Propylene was introduced into a 200-liter polymerization reactor equipped with a stirrer, and 3 mmols/kg-PP, in terms of Ti, of the pretreated solid catalyst component was fed into the reactor along with 4 mmols/kg-PP of triethylamine and 1 mmol/kg-PP of dicyclopentyldimethoxysilane. In the reactor, propylene was polymerized at a temperature of 80° C. The polymerization pressure (total pressure) in the reactor was 28 kg/cm$^2$G. In this process, hydrogen was fed into the reactor while its amount was so controlled that the polymer produced could have a predetermined molecular weight. The polymer (3-B) thus produced had an isotactic pentad fraction of 97.6 mol %, and a melt index of 5.9 g/10 min. During the polymerization process, the vapor phase in the reactor was analyzed through gas chromatography, and it had a hydrogen concentration of 4.2 mol %.

To the propylene polymer powder obtained in the manner as above, added were the following additives. Using a kneader, the resulting mixture was kneaded, extruded, and pelletized.

(1) Antioxidant:
  Ciba Specialty Chemicals' Irganox 1010, 1,000 ppm,
  Ciba Specialty Chemicals' Irgafos 168, 1,000 ppm.
(2) Neutralizing agent: Calcium stearate, 1,000 ppm.
(3) Anti-blocking agent: Silica compound, 1,000 ppm.
(4) Slip agent: Erucamide, 1,000 ppm.

The resin characteristics of the propylene polymer pellets thus obtained were evaluated, as in the section 1 "Resin Characteristics" mentioned hereinabove.

80 parts by weight of the copolymer (3-A) and 20 parts by weight of the propylene polymer (3-B) were well blended in a dry blender.

The resulting propylene-based resin mixture was formed into films, as in the section 2 "Film Formation" mentioned hereinabove, and the quality of the films was evaluated as in the section 3 "Film Characteristics" also mentioned hereinabove. The data obtained are given in Table 8.

EXAMPLE 12

A propylene-based polymer (3-B) was produced in the same manner as in Example 11. In this, however, ethylene and hydrogen were fed into the polymerization system while their amount was so controlled that the polymer produced could have a predetermined ethylene content and a predetermined molecular weight. The polymer (3-B) produced herein had an ethylene content of 3.0 mol %, an isotactic pentad fraction of 99.2 mol %, and a melt index of 8.5 g/10 min. During the polymerization process, the vapor phase in the reactor was analyzed through gas chromatography, and it had an ethylene concentration of 1.2 mol % and a hydrogen concentration of 4.3 mol %. The propylene-based polymer (3-B) thus produced herein was combined with the copolymer (3-A) produced in Example 11, and processed in the same manner as in Example 11. In this, however, 90 parts by weight of the copolymer (3-A) was blended with 10 parts by weight of the polymer (3-B). The data obtained are given in Table 8.

EXAMPLE 13

The same process as in Example 12 was repeated, except that the chill roll temperature was varied to 60° C. in the step of forming films. The data obtained are given in Table 8.

EXAMPLE 14

The same process as in Example 1 was repeated. In this, however, the amount of 1-octene used was 300 ml but not 500 ml, the polymerization temperature was 40° C. but not 50° C., and n-heptane but not toluene was used in the step of producing the copolymer (3-A). The data obtained are given in Table 8.

EXAMPLE 15

The same process as in Example 11 was repeated. In this, however, 500 ml of 1-dodecene but not 1-octene was used, the polymerization temperature was 40° C. but not 50° C., and n-heptane but not toluene was used in the step of producing the copolymer (3-A). The data obtained are given in Table 8.

EXAMPLE 16

The same process as in Example 11 was repeated. In this, however, 500 ml of 1-decene but not 1-octene was used, the polymerization temperature was 40° C. but not 50° C., and n-heptane but not toluene was used in the step of producing the copolymer (3-A). The data obtained are given in Table 8.

Comparative Example 8

The same process as in Example 11 was repeated. In this, however, 45 parts by weight of the copolymer (3-A) produced in Example 11 was blended with 55 parts by weight of the propylene polymer (3-B) produced in Example 11. The data obtained are given in Table 8.

Comparative Example 9

The copolymer (3-A) produced in Example 11 alone was formed into films, without adding the propylene polymer (3-B) thereto. The chill roll temperature in forming the films was 60° C. However, releasing the films from the chill roll was difficult, and the appearances of the films formed were not good.

Comparative Example 10

The same process as in Comparative Example 9 was repeated. In this, however, the chill roll temperature in the step of forming films was 30° C., like in Example 11.

Comparative Example 11

The same process as in Example 11 was repeated. In this, however, 500 ml of 1-butene but not 1-octene was used and n-heptane but not toluene was used in the step of producing the copolymer (3-A). The data obtained are given in Table 8.

Comparative Example 12

The same process as in Example 11 was repeated. In this, however, a copolymer (3-A) produced in the manner mentioned below was used.

6.0 liters of toluene, 6 mmols of triisobutylaluminium, and 20 µmols of dimethylanilinium tetrakispentafluorophenyl borate were put into a 10-liter stainless autoclave, and heated at 50° C., into which was introduced a mixed gas of ethylene/propylene (10/100 by volume) until the total pressure in the autoclave reached 7.0 kg/cm$^2$G.

In this stage, 5 µmols of (1,2'-ethylene)(2,1'-ethylene)-bis (indenyl)hafnium dichloride was added to the system, and the monomers were polymerized. During the process, propylene was fed into the system via a pressure controller so that the pressure in the autoclave could be kept constant. After 3 hours, the contents were taken out and dried under reduced pressure to obtain a copolymer. The data obtained are given in Table 8.

Reference Example 1

The same additives as in Example 11 were added to a commercially-available, linear low-density polyethylene (Idemitsu Moretec V0398CN), and the resulting resin composition was processed and evaluated in the same manner as in Example 11. The data obtained are given in Table 8.

TABLE 8

|  | Example 11 | Example 12 | Example 13 | Example 14 | Example 15 | Example 16 |
|---|---|---|---|---|---|---|
| Resin Characteristics of Copolymer 3-A |  |  |  |  |  |  |
| Type of Comonomer | 1-octene | ← | ← | 1-octene | 1-octene | 1-octene |
| α mol % | 4.0 | ← | ← | 3.2 | 3.8 | 4.4 |
| [η] g/dl | 1.5 | ← | ← | 1.7 | 1.9 | 1.9 |
| Tm ° C. | 108.0 | ← | ← | 114.0 | 108.7 | 103.9 |
| Tc ° C. | 67.8 | ← | ← | 74.6 | 67.0 | 63.2 |
| P mol % | 96.4 | ← | ← | 97.5 | 97.0 | 97.4 |
| Tp ° C. | 64.7 | ← | ← | 70.6 | 64.3 | 61.4 |
| W0 wt. % | 0.69 | ← | ← | 0.59 | 1.08 | 1.06 |
| Wp wt. % | 90.8 | ← | ← | 91.7 | 88.2 | 89.1 |
| B |  |  |  |  |  |  |
| Tm ° C. | 165.9 | 150.6 | ← | 165.9 | ← | ← |
| Tc ° C. | 117.0 | 106.9 | ← | 117.0 | ← | ← |
| Blend Ratio A/B | 80/20 | 90/10 | 90/10 | 80/20 | 80/20 | 80/20 |
| Chill Roll Temperature ° C. | 30 | 30 | 60 | 30 | 30 | 30 |
| Film Quality |  |  |  |  |  |  |
| Heat-Sealing Temperature ° C. | 102 | 100 | 103 | 108 | 101 | 100 |
| Anti-Blocking Properties N/m² |  |  |  |  |  |  |
| Condition 1 | 45 | 46 | 41 | 38 | 39 | 43 |
| Condition 2 | 24 | 26 | 21 | 19 | 20 | 24 |
| Slip Characteristics tanθ | 0.26 | 0.21 | 0.19 | 0.38 | 0.29 | 0.31 |
| Haze % | 1.0 | 1.1 | 1.6 | 1.5 | 1.2 | 1.0 |
| Tensile Modulus MPa | 540 | 510 | 560 | 670 | 530 | 480 |

|  | Comp. Ex. 8 | Comp. Ex. 9 | Comp. Ex. 10 | Comp. Ex. 11 | Comp. Ex. 12 | Ref. Ex. |
|---|---|---|---|---|---|---|
| Resin Characteristics of Copolymer 3-A |  |  |  |  |  |  |
| Type of Comonomer | 1-octene | ← | ← | 1-butene | ethylene | commercial product, LL |
| α mol % | 4.0 | ← | ← | 9.0 | 8.7 | 4.1 |
| [η] g/dl | 1.5 | ← | ← | 2.2 | 1.7 | 1.9 |
| Tm ° C. | 108.0 | ← | ← | 121.9 | 110.9 | 102.7 |
| Tc ° C. | 67.8 | ← | ← | 84.3 | 75.8 | 88.5 |
| P mol % | 96.4 | ← | ← | 97.6 | 97.8 | — |
| Tp ° C. | 64.7 | ← | ← | 79.1 | 71.6 | 69.3 |
| W0 wt. % | 0.69 | ← | ← | 0.34 | 0.64 | 2.64 |
| Wp wt. % | 90.8 | ← | ← | 86.8 | 68.7 | 57.4 |
| B |  |  |  |  |  |  |
| Tm ° C. | 165.9 | — | — | 165.9 | ← | — |
| Tc ° C. | 117.0 | — | — | 117.0 | ← | — |
| Blend Ratio A/B | 45/55 | 100/— | 100/— | 80/20 | 80/20 | 10/— |
| Chill Roll Temperature ° C. | 30 | 60 | 30 | 30 | 30 | 30 |
| Film Quality |  |  |  |  |  |  |
| Heat-Sealing Temperature ° C. | 135 | — | 100 | 118 | 108 | 99 |
| Anti-Blocking Properties N/m² |  |  |  |  |  |  |
| Condition 1 | 25 | — | 42 | 40 | 87 | 129 |
| Condition 2 | 5 | — | 20 | 19 | 49 | 53 |
| Slip Characteristics tanθ | 0.29 | — | 0.29 | 0.24 | 0.41 | 0.87 |
| Haze % | 3.8 | — | 1.0 | 3.6 | 1.3 | 1.4 |
| Tensile Modulus MPa | 900 | — | 490 | 600 | 310 | 110 |

Anti-blocking Properties:
Condition 1 for adhesion: at a temperature of 60° C. under a load of 36 kg/cm² for 3 hours.
Condition 2 for adhesion: at a temperature of 50° C. under a load of 15 kg/cm² for 1 hour.

The following Examples 17 to 21 and Comparative Examples 13 to 16 relate to the fourth aspect of the invention.

EXAMPLE 17

(1) Preparation of N-heptane Suspension of Silica-carried Methylaluminoxane 27.1 g of $SiO_2$ (Fuji Silicia's trade name P-10) was dried at 200° C. under reduced pressure for 2 hours to obtain 25.9 g of dry silica.

The dry silica was put into 400 ml of toluene cooled at −78° C. in a dry ice/methanol bath. With stirring, 145.5 ml of a toluene solution of methylaluminoxane (1.5 mols/liter) was dropwise added thereto through a dropping funnel, over a period of 1.0 hour. This was left as it was for 4 hours, and then heated from −78° C. up to 20° C. over a period of 6 hours. Then, this was left as it was for 4 hours. Next, this was further heated from 20° C. up to 80° C. over a period of 1 hour, and left at 80° C. for 4 hours. Through the process, the reaction of silica with methylaluminoxane was completed.

The resulting suspension was filtered at 60° C., and the solid thus separated was washed twice with 400 ml of toluene at 60° C., and then twice with 400 ml of n-hexane at 60° C.

The washed solid was dried at 60° C. under reduced pressure for 4 hours to obtain 33.69 g of silica-carried methylaluminoxane. The proportion of methylaluminoxane carried by silica was 23.12% by weight.

N-heptane was added to all the thus-obtained, silica-carried methylaluminoxane thereby making the resulting suspension have a volume of 500 ml. The suspension had a methylaluminoxane concentration of 0.27 mols/liter.

(2) Preparation of Silica-carried Metallocene Catalyst

In a nitrogen atmosphere, 74 ml (20 mmols) of the silica-carried methylaluminoxane suspension prepared in the above, and 40 μmols of rac-dimethylsilylene-bis-2-ethyl-4,5-benzoindenylzirconium dichloride in heptane were put into a 300 ml Schlenk, and stirred for 10 minutes at room temperature to prepare a silica-carried metallocene catalyst.

(3) Polymerization 5.0 liters of n-heptane, 5 mmols of triisobutylaluminium, 400 ml of 1-octene, and 40 μmols of the silica-carried metallocene catalyst prepared in the above were put into a 10-liter stainless steel autoclave, and heated at 50° C., into which was introduced propylene gas until the total pressure in the autoclave reached 8.0 $kg/cm^2G$. In that condition, the monomers were polymerized. During the process, propylene was fed into the system via a pressure controller so that the pressure in the autoclave could be kept constant. After 4 hours, the contents were taken out and dried under reduced pressure to obtain a propylene-octene random copolymer powder.

(4) Formulation of Additives

To the copolymer powder obtained in the manner as above, added were the following additives. Using a kneader, the resulting mixture was kneaded, extruded, and pelletized. The resin characteristics of the pellets were evaluated as in the section 1 "Resin Characteristics" mentioned hereinabove. The data obtained are given in Table 9.

Antioxidant:
 Ciba Specialty Chemicals' Irganox 1010, 1,000 ppm,
 Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.

(5) Formation and Evaluation of Films

The pellets were formed into films, as in the section 2 "Film Formation" mentioned hereinabove, and the quality of the films was evaluated as in the section 3 "Film Characteristics" also mentioned hereinabove. The data obtained are given in Table 9.

EXAMPLE 18

The same process as in Example 17 was repeated. In this, however, 500 ml but not 300 ml of 1-octene was used, and the polymerization temperature was 40° C. but not 50° C. The resin characteristics of the copolymer obtained herein and also the quality of the films produced herein are all given in Table 9.

EXAMPLE 19

(1) Preparation of Catalyst and Production of Copolymer 5.0 liters of n-heptane, 6 mmols of triisobutylaluminium and 300 ml of 1-octene were put into a 10-liter stainless steel autoclave. 40 μmols of dimethylanilinium tetrakispentafluorophenyl borate, and 20 μmols of rac-dimethylsilylene-bis-2-ethyl-4,5-benzoindenylzirconium dichloride were added thereto, and heated at 50° C. Propylene was introduced into the autoclave until the total pressure in the autoclave reached 8.0 $kg/cm^2G$. In that condition, the monomers were polymerized. During the process, propylene was fed into the system via a pressure controller so that the pressure in the autoclave could be kept constant. After 3 hours, the contents were taken out and dried under reduced pressure to obtain a propylene-butene random copolymer powder.

(2) Formulation of Additives

To the copolymer powder obtained in the manner as above, added were the following additives. Using a kneader, the resulting mixture was kneaded, extruded, and pelletized. The resin characteristics of the pellets were evaluated as in the section 1 "Resin Characteristics" mentioned hereinabove. The data obtained are given in Table 9.

Antioxidant:
 Ciba Specialty Chemicals' Irganox 1010, 1,000 ppm,
 Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.
Nucleating agent: Asada Milling's Talc MMR, 1,000 ppm.

(3) Formation and Evaluation of Films

Films were formed and evaluated in the same manner as in Example 17.

EXAMPLE 20

The same process as in Example 19 was repeated. In this, however, the amount of 1-octene fed into the polymerization system was 500 ml but not 300 ml, the polymerization temperature was 40° C. but not 50° C., and 1000 ppm of Shin-Nippon Rika's Gelol MD (dimethylbenzylidene-sorbitol) but not Talc MMR was used as the nucleating agent. The data of the resin characteristics and the film quality of the copolymer obtained are given in Table 9.

EXAMPLE 21

The same process as in Example 17 was repeated. In this, however, 700 ml of 1-dodecene but not 1-octene was fed into the polymerization system, and the polymerization temperature was 40° C. but not 50° C. The data of the resin characteristics and the film quality of the copolymer obtained are given in Table 9.

TABLE 9

|  |  | Examples | | | | |
| --- | --- | --- | --- | --- | --- | --- |
|  |  | 17 | 18 | 19 | 20 | 21 |
| Resin Characteristics | Type of Comonomer | 1-octene | 1-octene | 1-octene | 1-octene | 1-dodecene |
|  | Comonomer Content mol % | 3.3 | 3.8 | 4.1 | 4.9 | 3.8 |
|  | Melting Point (Tm) °C | 112.0 | 107.5 | 108.0 | 99.9 | 108.7 |
|  | Crystallization Temperature (Tc) °C | 76.3 | 73.0 | 80.2 | 71.0 | 73.6 |
|  | Stereospecificity Index (P) mol % | 96.2 | 96.3 | 96.7 | 97.7 | 97.0 |
|  | Intrinsic Viscosity dl/g | 1.2 | 1.5 | 1.8 | 2.0 | 1.2 |
| Film Quality | Heat-Sealing Temperature °C | 106 | 99 | 95 | 92 | 100 |
|  | Anti-Blocking Properties N/m² Condition 1 | 38 | 39 | 41 | 41 | 38 |
|  | Condition 2 | 19 | 20 | 25 | 18 | 17 |
|  | Slip Characteristics tanθ | 0.38 | 0.29 | 0.32 | 0.28 | 0.31 |
|  | Haze % | 1.5 | 1.4 | 1.8 | 2.0 | 1.5 |
|  | Tensile Modulus MPa | 670 | 560 | 560 | 500 | 580 |

Anti-blocking Properties:
Condition 1 for adhesion: at a temperature of 60° C. under a load of 36 kg/cm² for 3 hours.
Condition 2 for adhesion: at a temperature of 50° C. under a load of 15 kg/cm² for 1 hour.

Comparative Example 13

The same process as in Example 20 was repeated, except that the additives were changed to those mentioned below. In this, however, casting the resin composition into films ended in failure, and good films could not be obtained. The data of the resin characteristics of the copolymer produced herein are given in Table 10.

Antioxidant:
  Ciba Specialty Chemicals' Irganox 1010, 1.000 ppm,
  Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.

Comparative Example 14

The same process as in Example 17 was repeated, except that the method of producing the propylene-based random copolymer was changed to that mentioned below. In this, however, casting the resin composition into films ended in failure, and good films could not be obtained. The data of the resin characteristics of the copolymer produced herein are given in Table 10.

6 liters of toluene and 6 mmols of methylaluminoxane were put into a 10-liter stainless steel autoclave, and heated at 30° C., into which was introduced a mixed gas of ethylene/propylene (30/70 by volume) until the total pressure in the autoclave reached 7.0 kg/cm²G. In this stage, 0.6 μmols of rac-dimethylsilylene-bis-2-ethyl-4,5-benzoindenylzirconium dichloride was added to the system, and the monomers were polymerized. During the process, propylene was fed into the system via a pressure controller so that the pressure in the autoclave could be kept constant. After 1 hour, the contents were taken out and dried under reduced pressure to obtain a propylene-butene random copolymer powder.

Comparative Example 15

The same process as in Example 17 was repeated, except that the method of producing the propylene-based random copolymer was changed to that mentioned below. The data of the resin characteristics and the film quality of the copolymer produced herein are given in Table 10.

6 liters of toluene, 6 mmols of triisobutylaluminium, and 20 μmols of dimethylanilinium tetrakispentafluorophenyl borate were put into a 10-liter stainless steel autoclave, and heated at 50° C., into which was introduced a mixed gas of ethylene/propylene (10/100 by volume) until the total pressure in the autoclave reached 7.0 kg/cm²G. In this stage, 5 μmols of (1,2'-ethylene)(2,1'-ethylene)-bis(indenyl)hafnium dichloride was added to the system, and the monomers were polymerized. During the process, propylene was fed into the system via a pressure controller so that the pressure in the autoclave could be kept constant. After 3 hours, the contents were taken out and dried under reduced pressure to obtain a propylene-ethylene random copolymer powder.

Comparative Example 16

The same process as in Comparative Example 13 was repeated. In this, however, 500 ml of 1-butene but not 1-octene was fed into the polymerization system, and the polymerization temperature was 50° C. but not 40° C. The data of the resin characteristics and the film quality of the copolymer obtained are given in Table 10.

TABLE 10

| | | Comparative Examples | | | |
|---|---|---|---|---|---|
| | | 13 | 14 | 15 | 16 |
| Resin Characteristics | Type of Comonomer | 1-octene | ethylene | ethylene | 1-butene |
| | Comonomer Content mol % | 4.9 | 24.4 | 8.7 | 9.0 |
| | Melting Point (Tm) ° C. | 99.9 | 88.2 | 110.9 | 121.9 |
| | Crystallization Temperature (Tc) ° C. | 56.1 | 48.5 | 75.8 | 84.3 |
| | Stereospecificity Index (P) mol % | 97.7 | 97.6 | 97.8 | 97.6 |
| | Intrinsic viscosity dl/g | 2.0 | 1.7 | 1.7 | 2.2 |
| Film Quality | Heat-sealing Temperature ° C. | — | — | 109 | 116 |
| | Anti-Blocking Properties N/m² Condition 1 | — | — | 85 | 41 |
| | Condition 2 | — | — | 51 | 21 |
| | Slip Characteristics tan θ | — | — | 0.44 | 0.25 |
| | Haze % | — | — | 1.4 | 3.5 |
| | Tensile Modulus MPa | — | — | 320 | 540 |

Anti-blocking Properties:
Condition 1 for adhesion: at a temperature of 60° C. under a load of 36 kg/cm² for 3 hours.
Condition 2 for adhesion: at a temperature of 50° C. under a load of 15 kg/cm² for 1 hour.

The following Examples 22 to 25 and Comparative Examples 17 to 19 relate to the fifth aspect of the invention.

EXAMPLE 22

(1) Preparation of Catalyst and Production of Copolymer 5.0 liters of n-heptane, 6 mmols of triisobutylaluminium and 500 ml of 1-butene were put into a 10-liter stainless steel autoclave. 40 μmols of dimethylanilinium tetrakispentafluorophenyl borate, and 20 μmols of rac-dimethylsilylene-bis-2-ethyl-4,5-benzoindenylzirconium dichloride were added thereto, and heated at 50° C. Propylene gas was introduced into the autoclave until the total pressure in the autoclave reached 8.0 kg/cm²G. In that condition, the monomers were polymerized. During the process, propylene was fed into the system via a pressure controller so that the pressure in the autoclave could be kept constant. After 3 hours, the contents were taken out and dried under reduced pressure to obtain a propylene-butene random copolymer powder.

(2) Formulation of Additives

To the copolymer powder obtained in the manner as above, added were the following additives. Using a kneader, the resulting mixture was kneaded, extruded, and pelletized. The resin characteristics of the pellets were evaluated as in the section 1 "Resin Characteristics" mentioned hereinabove. The data obtained are given in Table 11.

Antioxidant:
  Ciba Specialty Chemicals' Irganox 1010, 1,000 ppm,
  Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.

(3) Formation and Evaluation of Films

Using a Tsukada Juki Seisakusho's 20 mmφ T-die casting machine, the pellets were cast through the T-die into films having a thickness of 30 μm, under the condition mentioned below. The quality of the films produced was evaluated as in the section 3 "Film Characteristics" mentioned hereinabove. The data obtained are given in Table 11.

EXAMPLE 23

A copolymer composition was produced in the same manner as in Example 22, except that the formulation of the additives was changed to that mentioned below. The resin characteristics and the film quality of the copolymer obtained were evaluated also in the same manner, and the data are given in Table 11.

Antioxidant:
  Ciba Specialty Chemicals' Irganox 1010, 1,000 ppm,
  Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.
Nucleating agent: Asada Milling's Talc MMR, 1,000 ppm.

EXAMPLE 24

The same process as in Example 23 was repeated. In this, however, 100 ml of 1-butene was used and the polymerization temperature was 60° C. The data of the resin characteristics and the film quality of the copolymer obtained are given in Table 11.

EXAMPLE 25

A copolymer composition was produced in the same manner as in Example 24 (22?), except that the formulation of the additives was changed to that mentioned below. The resin characteristics and the film quality of the copolymer obtained were evaluated also in the same manner, and the data are given in Table 11.

Antioxidant:
  Ciba Specialty Chemicals' Irganox 1010, 1,000 ppm,
  Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.
Nucleating agent: Shin-Nippon Rika's Gelol MD (dimethylbenzylidene-sorbitol), 1,000 ppm.

TABLE 11

|  |  | Example 13 | Example 14 | Example 15 | Example 16 |
|---|---|---|---|---|---|
| Resin Characteristics | 1-Butene Content mol % | 9.0 | 9.0 | 3.8 | 3.8 |
|  | Melting Point (Tm) °C. | 121.9 | 122.4 | 141.7 | 142.2 |
|  | Crystallization Temperature (Tc) °C. | 84.3 | 95.0 | 99.8 | 109.5 |
|  | Stereospecificity Index (P) mol % | 97.6 | 97.6 | 98.3 | 98.3 |
|  | Intrinsic Viscosity dl/g | 2.0 | 2.0 | 2.2 | 2.2 |
|  | Type of Nucleating Agent | — | Talc MMR | — | Gelol MD |
| Film Quality | Heat-Sealing Temperature °C. | 116 | 111 | 136 | 129 |
|  | Anti-Blocking Properties N/m² Condition 1 | 42 | 39 | 26 | 26 |
|  | Condition 2 | 22 | 23 | 15 | 18 |
|  | Slip Characteristics tan θ | 0.26 | 0.28 | 0.19 | 0.22 |
|  | Haze % | 3.2 | 2.1 | 1.5 | 1.8 |
|  | Tensile Modulus MPa | 490 | 660 | 1100 | 1200 |

Anti-blocking Properties:
Condition 1 for adhesion: at a temperature of 60° C. under a load of 36 kg/cm² for 3 hours.
Condition 2 for adhesion: at a temperature of 50° C. under a load of 15 kg/cm² for 1 hour.

Comparative Example 17

The same process as in Example 22 was repeated, except that the method of producing the propylene-based random copolymer was changed to that mentioned below. The data of the resin characteristics and the film quality of the copolymer produced herein are given in Table 12.

(1) Preparation of Magnesium Compound

A reactor (capacity: 500 liters) equipped with a stirrer was fully purged with nitrogen gas, and 97.2 kg of ethanol, 640 g of iodine and 6.4 kg of metal magnesium were put into it. With stirring, these were reacted under reflux until no hydrogen gas was given by the system. Thus was formed a solid reaction product. The reaction mixture containing the solid reaction product was dried under reduced pressure, and the intended magnesium compound (solid product) was obtained.

(2) Preparation of Solid Catalyst Component

A reactor (capacity: 500 liters) equipped with a stirrer was fully purged with nitrogen gas, and 30 kg of the magnesium compound (not ground), 150 liters of pure heptane (n-heptane), 4.5 liters of silicon tetrachloride, and 5.4 liters of di-n-butyl phthalate were put into it. These were kept at 90° C. With stirring, 144 liters of titanium tetrachloride was added thereto, and reacted at 110° C. for 2 hours. The resulting solid component was separated, and washed with pure heptane at 80° C. Then, 228 liters of titanium tetrachloride was added thereto, and further reacted at 110° C. for 2 hours. This was fully washed with pure heptane to obtain a solid catalyst component.

(3) Pretreatment 230 liters of pure heptane was put into a 500-liter reactor equipped with a stirrer, and 25 kg of the solid catalyst component was added thereto along with triethylaluminium in a ratio of 1.0 mol/mol of Ti of the solid catalyst component and with dicyclopentyldimethoxysilane in a ratio of 1.8 mols/mol of the same. Next, propylene was introduced into the reactor to have a propylene partial pressure of 0.3 kg/cm²G, and reacted at 25° C. for 4 hours. After having been thus processed, the solid catalyst component was washed a few times with pure heptane, and carbon dioxide was applied thereto and stirred for 24 hours.

(4) Polymerization 1.2 liters of n-heptane and 90 g of 1-butene were put into a 2-liter stainless steel autoclave that had been purged with nitrogen. This was heated at 70° C., and a mixed gas of propylene/hydrogen (16/1 by volume) was introduced thereinto. The total pressure in the autoclave was kept at 4.0 kg/cm²G. In that condition, 2.5 μmols, in terms of Ti, of the processed solid catalyst component, 1,000 μmols of triethylaluminium, and 25 μmols of dicyclopentyldimethoxysilane were put into the autoclave, and the monomers were polymerized for 1 hour. In this process, the mixed gas of propylene/hydrogen (16/1 by volume) so fed into the autoclave via a pressure controller that the pressure and the vapor composition in the autoclave could be kept constant. The polymer thus formed was taken out through filtration and dried under reduced pressure to obtain a propylene-butene random copolymer powder.

Comparative example 18

The same process as in Comparative Example 17 was repeated, except that 60 g of 1-butene was fed into the autoclave. The data of the resin characteristics and the film quality of the copolymer produced herein are given in Table 12.

Comparative Example 19

The same process as in Comparative Example 17 was repeated, except that 30 g of 1-butene fed into the autoclave. The data of the resin characteristics and the film quality of the copolymer produced herein are given in Table 12.

TABLE 12

|  |  | Comp. Ex. 17 | Comp. Ex. 18 | Comp. Ex. 19 |
|---|---|---|---|---|
| Resin Characteristics | 1-Butene Content mol % | 8.2 | 5.9 | 3.7 |
|  | Melting Point (Tm) °C. | 145.2 | 148.2 | 155.0 |
|  | Crystallization Temperature (Tc) °C. | 100.0 | 102.8 | 109.5 |
|  | Stereospecificity Index (P) mol % | 99.0 | 99.0 | 98.7 |
|  | Intrinsic Viscosity dl/g | 1.7 | 1.8 | 1.7 |
|  | Type of Nucleating Agent | — | — | — |
| Film Quality | Heat-Sealing Temperature °C. | 138 | 141 | 149 |
|  | Anti- Condition 1 | 24 | 24 | 21 |

TABLE 12-continued

|  | | Comp. Ex. 17 | Comp. Ex. 18 | Comp. |
|---|---|---|---|---|
| Blocking Properties N/m$^2$ | Condition 2 | 14 | 12 | 15 |
| Slip Characteristics tan θ | | 0.39 | 0.46 | 0.48 |
| Haze % | | 3.6 | 3.7 | 3.9 |
| Tensile Modulus MPa | | 720 | 830 | 930 |

Anti-blocking Properties:
Condition 1 for adhesion: at a temperature of 60° C. under a load of 36 kg/cm$^2$ for 3 hours.
Condition 2 for adhesion: at a temperature of 50° C. under a load of 15 kg/cm$^2$ for 1 hour.

The following Examples 26 to 29 and Comparative Examples 20 to 23 relate to the sixth aspect of the invention.

EXAMPLE 26

(1) Polymerization 5.0 liters of n-heptane, 6 mmols of triisobutylaluminium and 500 ml of 1-octene were put into a 10-liter stainless steel autoclave. 40 μmols of dimethylanilinium tetrakispentafluorophenyl borate, and 20 μmols of rac-dimethylsilylene-bis-2-ethyl-5,6-benzoindenylzirconium dichloride were added thereto, and heated at 40° C. Propylene gas was introduced into the autoclave until the total pressure in the autoclave reached 8.0 kg/cm$^2$G. In that condition, the monomers were polymerized. During the process, propylene was fed into the system via a pressure controller so that the pressure in the autoclave could be kept constant. After 1 hour, the contents were taken out and dried under reduced pressure to obtain a propylene-octene random copolymer.

(2) Blending and Kneading

To the copolymer obtained in the manner as above, added were the following additives. Through a single-screw extruder (Tsukada Juki Seisakusho's TLC35-20 Model), the resulting mixture was extruded and pelletized.

Antioxidant:
 Ciba Specialty Chemicals' Irganox 1010, 1,000 ppm,
 Ciba Specialty Chemicals' Irgafos 168, 1,000 ppm.
Neutralizing agent: Calcium stearate, 1,000 ppm.
Anti-blocking agent: Silica compound, 1,800 ppm.
Slip agent: Erucamide, 500 ppm.
Nucleating Agent: Shin-Nippon Rika's Gelol MD (dimethylbenzylidene-sorbitol), 1,000 ppm.

EXAMPLE 27

In the same manner as in Example 26, a polymer was produced and blended with additives. In this, however, 300 ml of 1-octene was used, the polymerization temperature was 50° C., and 1,000 ppm of Talc MMR (from Asada Milling) was used as the nucleating agent. The polymer composition was formed into films, and the films were evaluated. The data obtained are given in Table 13.

Comparative Example 20

The same process as in Example 26 was repeated, except that the nucleating agent was not added.

Comparative Example 21

The same process as in Example 27 was repeated, except that the nucleating agent was not added.

TABLE 13

| | | Example 26 | Comp. Ex. 20 | Example 27 | Comp. Ex. 21 |
|---|---|---|---|---|---|
| Resin Characteristics | 1-Octene Content mol % | 4.9 | 4.9 | 4.1 | 4.1 |
| | Intrinsic Viscosity [η] dl/g | 2.0 | 2.0 | 1.8 | 1.8 |
| | Melting Point (Tm) ° C. | 99.9 | 99.9 | 108 | 108 |
| | Stereospecificity Index (P) mol % | 97.7 | 97.7 | 96.7 | 96.7 |
| Film Quality | Heat-Sealing Temperature ° C. | 90 | 95 | 93 | 100 |
| | Anti-Blocking Properties N/m$^2$ | 28 | 23 | 26 | 20 |
| | Slip Characteristics tan θ | 0.31 | 0.25 | 0.35 | 0.29 |
| | Haze % | 1.8 | 1.1 | 1.5 | 1.0 |
| | Tensile Modulus MPa | 457 | 360 | 510 | 490 |
| | 22 × HST − 1700 | 280 | 390 | 346 | 500 |

EXAMPLE 28

(1) Polymerization 5.0 liters of n-heptane, 6 μmols of triisobutylaluminium and 500 ml of 1-butene were put into a 10-liter stainless steel autoclave. 20 μmols of dimethylanilinium tetrakispentafluorophenyl borate, and 10 μmols of rac-dimethylsilylene-bis-2-ethyl-5,6-benzoindenylzirconium dichloride were added thereto, and heated at 50° C. Propylene gas was introduced into the autoclave until the total pressure in the autoclave reached 8.0 kg/cm$^2$G. In that condition, the monomers were polymerized. During the process, propylene was fed into the system via a pressure controller so that the pressure in the autoclave could be kept constant. After 4 hours, the contents were taken out and dried under reduced pressure to obtain a propylene-butene random copolymer.

(2) Blending and Kneading

To the copolymer obtained in the manner as above, added were the same additives as in Example 26. Through a single-screw extruder (Tsukada Juki Seisakusho's TLC35-20 Model), the resulting mixture was extruded and pelletized.

(3) Film Formation

Using a 20 mmφ T-die casting machine (from Tsukada Juki Seisakusho), the resin pellets were cast into films having a thickness of 30 μm, under the same condition as in Example 26.

(4) Evaluation of Films

The films were aged at 40° C. for 24 hours, and their quality was evaluated as in the section 3 "Film Characteristics" mentioned hereinabove. The data obtained are given in Table 14.

EXAMPLE 29

In the same manner as in Example 28, a polymer was produced, blended with additives, formed into films and evaluated. In this, however, 100 ml of 1-butene was used, and the polymerization temperature was 60° C. The data obtained are given in Table 14.

Comparative Example 22

The same process as in Example 28 was repeated, except that the nucleating agent was not added.

Comparative Example 23

The same process as in Example 29 was repeated, except that the nucleating agent was not added.

TABLE 14

| | | Example 28 | Comp. Ex. 22 | Example 29 | Comp. Ex. 23 |
|---|---|---|---|---|---|
| Resin Characteristics | 1-butene Content mol % | 9.0 | 9.0 | 3.8 | 3.8 |
| | Intrinsic Viscosity [η] dl/g | 2.0 | 2.0 | 2.2 | 2.2 |
| | Melting Point (Tm) ° C. | 122 | 122 | 142 | 142 |
| | Stereospecificity Index (P) mol % | 97.6 | 97.6 | 97.9 | 97.9 |
| | Boiling Ether Extraction wt. % | 1.2 | 1.2 | 0.5 | 0.5 |
| Film Quality | Heat-Sealing Temperature ° C. | 111 | 116 | 129 | 136 |
| | Anti-Blocking Properties N/m$^2$ | 23 | 22 | 18 | 15 |
| | Slip Characteristics tan θ | 0.28 | 0.26 | 0.22 | 0.19 |
| | Haze % | 2.1 | 3.2 | 1.8 | 1.5 |
| | Tensile Modulus MPa | 661 | 490 | 1200 | 1100 |
| | 22 × HST − 1700 | 592 | 702 | 988 | 1142 |

INDUSTRIAL APPLICABILITY

According to the invention, obtained are propylene-based polymers and their films having high toughness and good heat-sealability.

The propylene-based polymers and the propylene-based polymer compositions of the invention have excellent low-temperature heat-sealability comparable to that of linear low-density polyethylene, without detracting from the characteristics intrinsic to polypropylene resins, and have well-balanced toughness and heat-sealability. In addition, their films are not sticky and have significantly improved anti-blocking properties and slip characteristics, still keeping the excellent characteristics intrinsic to polypropylene resin films, such as high toughness, high transparency and good moisture-proofness. Further, the polymers and the polymer compositions have much improved moldability.

Moreover, the propylene-based resins of the invention are favorable to sealant layers in laminates and co-extruded layered films. What is more, as having excellent low-temperature heat-sealability, anti-blocking properties, slip characteristics and toughness, they are favorable to ordinary fibers, sheets, moldings, and even laminates comprising at least one layer of the resin.

What is claimed is:

1. A propylene-based polymer composition, comprising:
   (1-A) a propylene homopolymer obtained through polymerization in the presence of a metallocene catalyst and having an isotactic pentad fraction (mmmm fraction) of from 80 to 99 mol %, a molecular weight distribution (Mw/Mn) of at most 3.5, and an intrinsic viscosity (η) of from 0.5 to 5.0 dl/g; and
   (1-B) at least 10 ppm of at least one nucleating agent selected from the group consisting of a metal salt of an organic phosphoric acid, talc, dibenzylidene-sorbitol or its derivative, an amide compound and a polymer capable of inducing a crystalline nucleus in said propylene homopolymer (1-A) to thereby lower a degree of supercooling.

2. A propylene-based polymer composition, comprising:
   (1-A') a propylene-based random copolymer obtained through polymerization of propylene, and ethylene and/or an α-olefin having from 4 to 20 carbon atoms in the presence of a metallocene catalyst, and having a propylene-derived structural unit content of from 80 to 100 mol %, an ethylene and/or C4–C20 α-olefin-derived structural unit content of from 0 to 20 mol %, a molecular weight distribution (Mw/Mn) of at most 3.5, and an intrinsic viscosity (η) of from 0.5 to 5.0 dl/g; and
   (1-B) at least 10 ppm of at least one nucleating agent selected from the group consisting of a metal salt of an organic phosphoric acid, talc, dibenzylidene-sorbitol or its derivative, an amide compound, and a polymer capable of inducing a crystalline nucleus in said propylene-based random copolymer (1-A') to thereby lower a degree of supercooling.

3. The propylene-based polymer composition of claims 1 or 2 having a tensile modulus TM in MPa in the MD direction and a heat-sealing temperature HST in ° C. which satisfy the following formula (1-II):

$$TM \geq 22 \times HST - 1850 \qquad (1\text{-}II).$$

4. Films as formed by casting the propylene-based polymer composition of claim 1.

5. Films for wrapping or packaging edibles, which are formed by casting the propylene-based polymer composition of claim 1.

6. A polypropylene-based resin composition, comprising:

(2-A) from 50 to 99 parts by weight of a propylene homopolymer obtained through polymerization in the presence of a metallocene catalyst and having an isotactic pentad fraction (mmmm fraction) of from 80 to 99 mol %, an intrinsic viscosity (η) of from 1.0 to 2.0 dl/g, and a molecular weight distribution (Mw/Mn) of at most 3.5; and (2-B) from 1 to 50 parts by weight of a propylene homopolymer obtained through polymerization in the presence of a metallocene catalyst and having an intrinsic viscosity (η) of from 0.01 to 1.0 dl/g, and a molecular weight distribution (Mw/Mn) of at most 3.5.

7. Films made of the polypropylene-based resin composition of claim 6.

8. A propylene-based resin, comprising:

(3-A) from 55 to 99 parts by weight of a copolymer of propylene and an α-olefin having at least 5 carbon atoms; and (3-B) from 1 to 45 parts by weight of a propylene-based polymer of which the crystallization temperature as measured through differential scanning calorimetry is higher than that of (3-A);

wherein said copolymer (3-A) satisfies the following requirements:

(A-i) an amount W(A)p of its fraction eluted within the temperature range (Tp-5)° C. and (Tp+5)° C. is at least 70% by weight, wherein Tp is the peak temperature for elution in the temperature-programed fractionation chromatography of said copolymer; and (A-ii) an amount W(A)0 of its fraction eluted within the temperature range not higher than 0° C. in the temperature-programed fractionation chromatography of said copolymer is at most 3% by weight.

9. The propylene-based resin as claimed in claim 8, wherein a crystallization temperature Tca in ° C. of the copolymer (3-A) and a crystallization temperature Tcb in ° C. of the propylene-based polymer (3-B), both measured through differential scanning calorimetry, satisfy the following formula:

$$Tcb-Tca \geq 20 \quad (3\text{-}I).$$

10. The propylene-based resin as claimed in claim 8, which satisfies the following requirements (i), (ii) and (iii) in its temperature-programmed fractionation chromatography:

(i) an amount of a fraction of said propylene-based resin eluted within the temperature range between (Tp−5)° C. and (Tp+5)° C. is at least 65% by weight, with Tp being the peak temperature for essential elution;

(ii) an amount of a fraction of said propylene-based resin eluted within the temperature range not higher than 0° C. is at most 3% by weight; and (iii) the amount of a fraction of said propylene-based resin eluted within the temperature range not lower than Tp+10° C. is from 1 to 45% by weight of all eluates.

11. The propylene-based resin as claimed in claim 8, of which the peak top temperature on the highest temperature side in its crystallization curve measured through differential scanning calorimetry is not lower than 85° C.

12. The propylene-based resin as claimed in claim 8, of which the peak top temperature on the lowest temperature side in its melting curve measured through differential scanning calorimetry is not higher than 150° C.

13. The propylene-based resin as claimed in claim 8, wherein the copolymer (3-A) satisfies the following (A-i) and (A-ii) in its temperature-programmed fractionation chromatography:

(A-i) an amount of a fraction of said copolymer (3-A) eluted within the temperature range between (Tp−5)° C. and (Tp+5)° C. is at least 70% by weight, with Tp being the peak temperature for essential elution; and (A-ii) an amount of a fraction of said copolymer (3-A) eluted within the temperature range not higher than 0° C. is at most 3% by weight.

14. The propylene-based resin as claimed in claim 8, wherein the copolymer (3-A) satisfies at least any one of the following (A-iii), (A-iv) and (A-v):

(A-iii) a content of α-olefin units having at least 5 carbon atoms in the copolymer (3-A) is from 0.1 mol % to 12 mol %;

(A-iv) a stereospecificity index (P) of the copolymer (3-A) is at least 85 mol %; and (A-v) an intrinsic viscosity (η) of the copolymer (3-A), as measured in decalin at 135° C., is from 0.5 to 3.0 g/dl.

15. The propylene-based resin as claimed in claim 8, wherein the constituent α-olefin units having at least 5 carbon atoms in the copolymer (3-A) are selected from the group consisting of 1-octene, 1-decene, 1-dodecene and mixtures thereof.

16. Films made of the propylene-based resin of claim 8.

17. Laminates comprising at least one layer of the propylene-based resin of claim 8.

18. A propylene-based random copolymer, comprising:
propylene and an α-olefin having at least 5 carbon atoms;
wherein said propylene-based random copolymer satisfies the following formula (4-I):

$$Tm \leq 140, \text{ and } Tm \leq 160-7\alpha \quad (4\text{-}I)$$

wherein Tm in ° C. indicates the melting point of the copolymer measured through differential scanning calorimetry, and α in mol % indicates the content of α-olefin units having at least 5 carbon atoms in the copolymer;

and wherein said propylene-based random copolymer satisfies the following formula (4-II):

$$Tc \geq 0.75Tm-15 \quad (4\text{-}II)$$

wherein Tc in ° C. and Tm in ° C. each indicate the crystallization temperature and the melting point, respectively, of the copolymer both measured through differential scanning calorimetry.

19. The propylene-based random copolymer as claimed in claim 18, wherein a content of a-olefin units having at least 5 carbon atoms is from 0.1 to 12 mol %.

20. The propylene-based random copolymer as claimed in claim 18, which has a stereospecificity index (P) of at least 85 mol %.

21. The propylene-based random copolymer as claimed in claim 18, which has an intrinsic viscosity (η), as measured in decalin at 135° C., of from 0.5 to 3 dl/g.

22. The propylene-based random copolymer as claimed in claim 18, wherein the α-olefin units having at least 5 carbon atoms are selected from the group consisting of 1-octene, 1-decene, 1-dodecene and mixtures thereof.

23. A propylene-based random copolymer composition, comprising:

(4-A) a propylene-based random copolymer of propylene and an α-olefin having at least 5 carbon atoms; and (4-B) a substance having the capability of nucleation, which is at least one nucleating agent selected from the group consisting of a metal salt of an organic phosphoric acid, talc, dibenzylidene-sorbitol or its derivative, an amide compound, and a polymer capable of inducing a crystalline nucleus in said propylene-based random copolymer (4-A) to thereby lower a degree of supercooling;

wherein said composition satisfies the following formula (4-I):

$$Tm \leq 140, \text{ and } Tm \leq 160-7\alpha \tag{4-II}$$

wherein Tm in ° C. indicates the melting point of the composition measured through differential scanning calorimetry, and α in mol % indicates the content of α-olefin units having at least 5 carbon atoms in the composition;

wherein said composition satisfies the following formula (4-II):

$$Tc \geq 0.75Tm-15 \tag{4-II}$$

wherein Tc in ° C. and Tm in ° C. each indicate the crystallization temperature and the melting point, respectively, of the composition both measured through differential scanning calorimetry.

24. The propylene-based random copolymer composition as claimed in claim 23, wherein a content of α-olefin units having at least 5 carbon atoms is from 0.1 to 12 mol %.

25. The propylene-based random copolymer composition as claimed in claim 23, wherein the copolymer has a stereospecificity index (P) of at least 85 mol %.

26. The propylene-based random copolymer composition as claimed in claim 23, which has an intrinsic viscosity (η), as measured in decalin at 135° C., of from 0.5 to 3 dl/g.

27. The propylene-based random copolymer composition as claimed in claim 23, wherein the α-olefin units having at least 5 carbon atoms are selected from the group consisting of 1-octene, 1-decene, 1-dodecene and mixtures thereof.

28. Films made of the propylene-based random copolymer or the propylene-based random copolymer composition of claim 18.

29. Laminates comprising at least one layer of the propylene-based random copolymer or the propylene-based random copolymer composition of claim 18.

30. Fibers, sheets or moldings comprising the propylene-based random copolymer or the propylene-based random copolymer composition of claim 18.

31. A propylene-based random copolymer, comprising:
propylene and 1-butene;
wherein said propylene-based random copolymer satisfies the following formula (5-I):

$$Tm \leq 160-3\alpha \tag{5-I}$$

wherein Tm in ° C. indicates the melting point of the copolymer measured through differential scanning calorimetry, and α in mol % indicates the 1-butene unit content of the copolymer;

and wherein said propylene-based random copolymer satisfies the following formula (5-II):

$$Tc \geq 0.75Tm-10 \tag{5-II}$$

wherein Tc in ° C. and Tm in ° C. each indicate the crystallization temperature and the melting point, respectively, of the copolymer both measured through differential scanning calorimetry.

32. The propylene-based random copolymer as claimed in claim 31, which has a 1-butene content of from 0.1 to 30 mol %.

33. The propylene-based random copolymer as claimed in claim 31, which has a stereospecificity index (P) of at least 85 mol %.

34. The propylene-based random copolymer as claimed in claim 31, which has an intrinsic viscosity (η), as measured in decalin at 135° C., of from 0.5 to 3 dl/g.

35. A propylene-based random copolymer composition, comprising:

(5-A) a propylene-based random copolymer of propylene and 1-butene; and (5-B) a substance having the capability of nucleation, which is at least one nucleating agent selected from the group consisting of a metal salt of an organic phosphoric acid, talc, dibenzylidene-sorbitol or its derivative, an amide compound, and a polymer capable of inducing a crystalline nucleus in said propylene-based random copolymer (5-A) to thereby lower a degree of supercooling;

wherein the composition satisfies the following formula (5-I):

$$Tm \leq 160-3\alpha \tag{5-I}$$

wherein Tm in ° C. indicates the melting point of the composition measured through differential scanning calorimetry, and α in mol % indicates the 1-butene content of the composition;

and wherein the composition satisfies the following formula (5-II):

$$Tc \leq 0.75Tm-10 \tag{5-II}$$

wherein Tc in ° C. and Tm in ° C. each indicate the crystallization temperature and the melting point, respectively, of the composition both measured through differential scanning calorimetry.

36. The propylene-based random copolymer composition as claimed in claim 35, which has a 1-butene content of from 0.1 to 30 mol %.

37. The propylene-based random copolymer composition as claimed in claim 35, wherein the copolymer has a stereospecificity index (P) of at least 85 mol %.

38. The propylene-based random copolymer composition as claimed in claim 35, which has an intrinsic viscosity (η), as measured in decalin at 135° C., of from 0.5 to 3 dl/g.

39. Films made of the propylene-based random copolymer or the propylene-based random copolymer composition of claim 31.

40. Laminates comprising at least one layer of the propylene-based random copolymer or the propylene-based random copolymer composition of claim 31.

41. Fibers, sheets or moldings comprising the propylene-based random copolymer or the propylene-based random copolymer composition of claim 31.

42. A propylene-based polymer composition, comprising:

(6-A) a propylene-based random copolymer obtained through polymerization of propylene and an α-olefin having at least 4 carbon atoms in the presence of a metallocene catalyst, and having a propylene-derived structural unit content of from 80 to 99.9 mol %, an α-olefin-derived structural unit content of from 0.1 to 20 mol %, and an intrinsic viscosity (η) of from 0.5 to 5.0 dl/g; and (6-B) at least 10 ppm of at least one nucleating agent selected from the group consisting of a metal salt of an organic phosphoric acid, talc, dibenzylidene-sorbitol or its derivative, an amide compound, and a polymer capable of inducing a crystalline nucleus in said propylene-based random copolymer (6-A) to thereby lower a degree of supercooling.

43. The propylene-based polymer composition as claimed in claim 42, wherein the α-olefin has at least 5 carbon atoms.

44. The propylene-based polymer composition as claimed in claim 42, in which the α-olefin is 1-butene and of which a tensile modulus TM in MPa in the MD direction and a heat-sealing temperature HST in ° C. satisfy the following formula (6-I):

$$TM \geq 22 \times HST - 1850 \qquad (6\text{-}I).$$

45. The propylene-based polymer composition as claimed in claim 42, of which the tensile modulus TM in MPa in the MD direction and the heat-sealing temperature in ° C. satisfy the following formula (6-II):

$$TM \geq 22 \times HST - 1700 \qquad (6\text{-}II).$$

46. The propylene-based polymer composition as claimed in claim 42, of which the boiling diethyl ether-soluble content E in % by weight and the α-olefin content α in mol % satisfy the following formula (6-III):

$$E \leq 0.2 \times \alpha + 1.0 \qquad (6\text{-}III).$$

47. Films as formed by casting the propylene-based polymer composition of claim 42.

48. A polypropylene-based resin composition, consisting essentially of:

(2-A) from 50 to 99 parts by weight of a propylene homopolymer obtained through polymerization in the presence of a metallocene catalyst and having an isotactic pentad fraction (mmmm fraction) of from 80 to 99 mol %, an intrinsic viscosity (η) of from 1.0 to 2.0 dl/g, and a molecular weight distribution (Mw/Mn) of at most 3.5; and (2-B) from 1 to 50 parts by weight of a propylene homopolymer obtained through polymerization in the presence of a metallocene catalyst and having an intrinsic viscosity (η) of from 0.01 to 1.0 dl/g, and a molecular weight distribution (Mw/Mn) of at most 3.5.

* * * * *